US008756697B2

(12) United States Patent
Ocepek et al.

(10) Patent No.: US 8,756,697 B2
(45) Date of Patent: Jun. 17, 2014

(54) SYSTEMS AND METHODS FOR DETERMINING VULNERABILITY TO SESSION STEALING

(75) Inventors: Steven R. Ocepek, Cuyahoga Falls, OH (US); Wendel Guglielmetti Henrique, Ribeirão Preto (BR)

(73) Assignee: Trustwave Holdings, Inc., Chicago, IL (US)

( * ) Notice: Subject to any disclaimer, the term of this patent is extended or adjusted under 35 U.S.C. 154(b) by 133 days.

(21) Appl. No.: 13/436,818

(22) Filed: Mar. 30, 2012

(65) Prior Publication Data

US 2012/0255022 A1 Oct. 4, 2012

Related U.S. Application Data

(60) Provisional application No. 61/478,341, filed on Apr. 22, 2011, provisional application No. 61/469,439, filed on Mar. 30, 2011.

(51) Int. Cl.
| | |
|---|---|
| *H04L 29/06* | (2006.01) |
| *G06F 11/00* | (2006.01) |
| *G06F 12/14* | (2006.01) |
| *G06F 12/16* | (2006.01) |
| *G08B 23/00* | (2006.01) |

(52) U.S. Cl.
USPC .................. 726/25; 726/3; 726/11; 713/151; 713/155

(58) Field of Classification Search
None
See application file for complete search history.

(56) References Cited

U.S. PATENT DOCUMENTS

| 5,835,726 | A | * | 11/1998 | Shwed et al. ................. 709/229 |
|---|---|---|---|---|
| 6,321,336 | B1 | * | 11/2001 | Applegate et al. .............. 726/11 |
| 7,243,225 | B2 | * | 7/2007 | Poeluev et al. ................ 713/151 |
| 7,421,576 | B1 | * | 9/2008 | Kent ............................. 713/155 |
| 8,201,256 | B2 | | 6/2012 | Patanella |
| 2004/0193918 | A1 | | 9/2004 | Green et al. |
| 2005/0060582 | A1 | * | 3/2005 | Choi et al. ..................... 713/201 |
| 2006/0106866 | A1 | | 5/2006 | Green et al. |
| 2007/0300290 | A1 | * | 12/2007 | Shay et al. ......................... 726/3 |
| 2009/0234972 | A1 | | 9/2009 | Raghu et al. |

OTHER PUBLICATIONS

Ocepek, Steve and Wendel G. Henrique, Trustwave, "Oracle, Interrupted: Stealing Sessions and Credentials," A Whitepaper for Black Hat Europe 2010, Revision 1.1, Apr. 20, 2010, 52 pages.

(Continued)

*Primary Examiner* — Shin-Hon Chen
(74) *Attorney, Agent, or Firm* — Hanley, Flight & Zimmerman, LLC

(57) ABSTRACT

Systems and methods for determining vulnerability to session stealing are disclosed. An example method includes intercepting, at a first computing device, an intercepted packet sent from a client to a second computing device different than the first computing device, the intercepted packet including a first instruction in a first portion of the intercepted packet, determining, using a template, a second portion of the intercepted packet that is a value that is changed by a calculated amount each time that the client sends a packet, changing the value by the calculated amount to determine a next value for a next packet, replacing the second portion of the intercepted packet with the next value to generate a modified packet, replacing the first portion of the modified packet with a second instruction, and transmitting the modified packet to the second computing device.

21 Claims, 14 Drawing Sheets

(56) References Cited

OTHER PUBLICATIONS

Joncheray, Laurent, "Simple Active Attack Against TCP," Proceedings of the Fifth USENIX UNIX Security Symposium, Salt Lake City, Utah, Jun. 1995, retrieved at <http://www.usenix.org/publications/library/proceedings/security95/full_papers/joncheray.txt> on Jan. 10, 2014, 17 pages.

Ocepek, Steve, Trustwave, "Long-Term Sessions: this is why we can't have Nice Things," A Whitepaper for Black Hat USA 2009, Jun. 24, 2009, 21 pages.

Henrique, Wendel Guglielmetti, Trustwave, "Practical Oracle Security Testing," You Sh0t the Sheriff 3.0, Sao Paulo, Jun. 2009, 48 pages.

Tóth, Láaszló, Price Waterhouse Coopers, "Downgrading the Oracle native authentication," Feb. 5, 2007, 13 pages.

Vonjeek, edited by RevMoon, "The next level of Oracle attacks," Mar. 25, 2007, 17 pages.

Red-Database-Security GmbH, "Great collection and research about Oracle hacking techniques," Hacking Oracle, Version 1.5.0, Jan. 29, 2008, 5 pages.

\* cited by examiner

602 { 15:00:35.132175    IP    192.168.1.126.52950    >    192.168.1.1.22    (S)
2003293573:2003293573(0)  win  65535  <mss 1316,nop,wscale 3,nop,nop,timestamp
809614749 0,sackOK,eol>                                                    604

606 { 15:00:35.133810    IP    192.168.1.1.22    >    192.168.1.126.52950    (S)
2746725458:2746725458(0) (ack) 2003293574  win 5792  <mss 1460,sackOK,timestamp
1790130394 809614749,nop,wscale 6>
                         610                                                608

612 { 15:00:35.133853 IP 192.168.1.126.52950 > 192.168.1.1.22  (ack) 1  win  65535
<nop,nop,timestamp 809614749 1790130394>
                                                              614

FIG. 6 ically do not
SYSTEMS AND METHODS FOR DETERMINING VULNERABILITY TO SESSION STEALING

RELATED APPLICATION

This patent claims priority to U.S. Provisional Patent Application Ser. No. 61/469,439, filed on Mar. 30, 2011, and U.S. Provisional Patent Application Ser. No. 61/478,341, filed on Apr. 22, 2011, which are hereby incorporated herein by reference in their entirety.

FIELD OF THE DISCLOSURE

The present disclosure relates generally to computer system vulnerability and, more particularly, to systems and methods for determining vulnerability to session stealing.

BACKGROUND

There are multiple ways in which an entity may penetrate or attack a company's computer system. One common method employed by malicious hackers to gain such access is via protocol manipulation attacks. The common end result of a protocol manipulation attack is that an ongoing communication session is stolen by a malicious user, and the malicious user acts as if he were the original user. This is commonly referred to as session theft. Although the protocols used by many systems contain encryption features or tools which may defeat a protocol manipulation attack that results in session theft, managers and/or users of these systems typically do not employ the available encryption tools. For example, managers and/or users of a given system often assume that the encryption feature is activated when in fact it is not. Similarly, the owner of the system and the corresponding protocol might charge its client to use the corresponding encryption tool, and those clients simply choose to forego paying the extra money for the use of the encryption tool. Moreover, the system may lack an encryption tool, and therefore, the user is required to purchase an encryption tool from a third party, but fails to do so. All these situations result in many purchasers of software systems failing to employ an encryption tool or security feature, and thus the system is vulnerable to protocol manipulation and session theft. There are various ways a party can attempt to assess its compliance with security policies and determine the corresponding system's vulnerabilities. For example, a consultant can question a corporation's information officer to determine what measures that corporation has in place to safeguard its computerized information. Additionally or alternatively, the corporation can employ automated tools to perform the assessment.

BRIEF DESCRIPTION OF THE DRAWINGS

FIG. 6 is an illustration of the content of packets as used by an embodiment of the disclosed systems and methods;

DETAILED DESCRIPTION

Figure 1A:
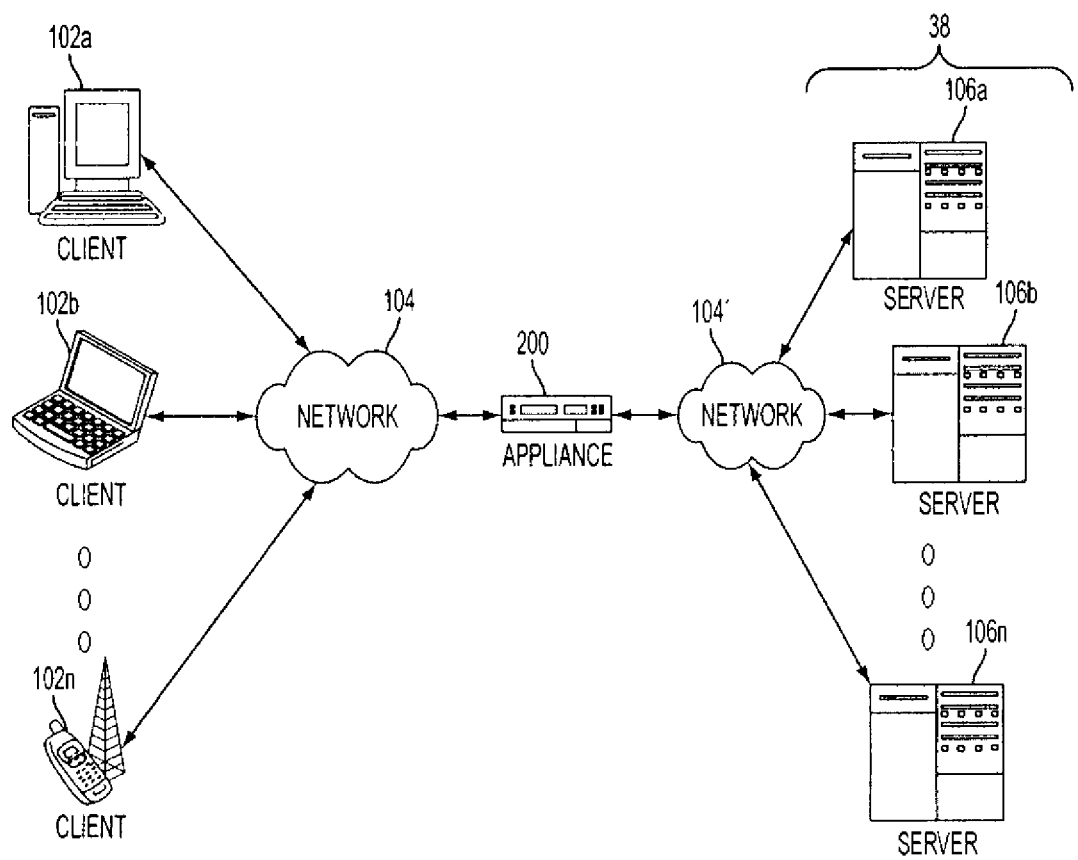
FIG. 1A is a block diagram of an embodiment of a network environment that may be used in conjunction with the disclosed systems and methods.

Although automated vulnerability testing products can conduct penetration testing of a system's vulnerabilities to attacks by actively probing gateways, DNS servers and networks of a user's computer network, these applications do not provide an analysis that is related specifically to session theft. Moreover, existing automated penetration tools lack an analytical mechanism to devise and manage such computer infrastructure testing for session theft.

Therefore, it would be advantageous if a system and method existed which provided automated prompting for, and collection of, information via a manual or automated questionnaire that resulted in an assessment of the vulnerability of a user's computer network to protocol manipulation and vulnerability to session theft, based on that input data. Moreover, it would be advantageous if a system and method existed which performed that assessment of vulnerability protocol manipulation and session theft by simulating penetration attacks of the user's network specifically for protocol attacks, and attempted to perform session theft by generating data which assessed the user's network in terms of vulnerabilities to protocol attacks.

Moreover, it would be advantageous to have a system that could test for, by way of example only, whether a given network was vulnerable to Layer 2 and/or Layer 3 penetration attacks, as well as test whether a given network was vulnerable to system layer attacks.

Some embodiments of the presented system may help to alleviate the problems discussed above and may provide a cost-effective and orderly method for assessing the vulnerability of a user's network to protocol attacks and session theft. For example, some embodiments of the presented system may permit a security officer to ascertain vulnerabilities in an existing network to protocol manipulation that could lead to an authorized session being stolen and manipulated. The security manager may be able to ascertain these vulnerabilities via disclosed methods, or by using the system and apparatus of the embodiments of the presented system. Such a system and apparatus may, for example, comprise a computer system.

An apparatus utilizing the systems and methods according to the embodiments presented herein may be described as a network penetration assessor. This network penetration assessor may be designed as a series of modules, all of which have specific functions.

A first module, a data gathering module, accepts information collected either manually from a user to aid in the network penetration assessment, or the information collection may be automated, or both. The gathered information includes general information about a network to be tested, such as the number of locations that would require evaluation. Additionally, the inputs to the data gathering module may include information relating to the types of vulnerabilities that the user wishes to be investigated, including, for example, operating system vulnerabilities, network communication vulnerabilities, denial of service vulnerabilities, and vulnerability to protocol attack or protocol manipulation. Input to the data gathering module may also include information relating to custom software applications the user wants the apparatus of the embodiments of the presented system to attempt to penetrate, as well as the frequency with which the user would like the penetration testing to be performed. Other input information may include the time of day at which the user would like the penetration testing to occur, as well as "black-out" periods (times and dates) related to normal business operations during which testing would not be performed. One way that data may be input into the data input module may be through the use of a customized questionnaire. Such a questionnaire may be provided on a traditional paper medium, or may be provided in an electronic format, for example, through an HTML interface. Once the data has been gathered, or even simultaneously as the data is gathered, it is provided to the next module run, the network mapping module.

The next module, the network mapping module, assembles the data collected by the data gathering module, as well as assembles data either via manual input or automated input, so as to allow for a mapping of the network being tested. The data gathered and input into the network mapping module can include internal IP address space for the network being evaluated. Using the information collected by the data input module, and the information collected manually, the network mapping module identifies each of the systems located on the network, and then classifies each of the identified systems. From these identified and classified systems, the network mapping module generates a list of targets that might need to be evaluated during the penetration testing.

Next, the network evaluator module evaluates and classifies each of the systems found on the network, as well as identifies the specific vulnerability of each system, and identifies how that vulnerability can be exploited.

Next, the network penetration testing module analyzes each of the classifications for each of the systems found on the network by the network mapping module, so as to identify the applications running on each of the networks. After each application has been identified, the network penetration module can conduct tests to determine whether each application possesses any risk of exploitation. The network penetration testing module may execute programs that test whether a session can be manipulated or stolen. More specifically, the network penetration testing module may investigate whether a given protocol is susceptible to protocol manipulation that could allow for session theft, and the network penetration testing module will determine whether the network being tested allows the session to be taken over. The network penetration testing module then determines whether data can be inserted into the data stream, and tests whether the data has been formatted to exactly match the data packet expected by the host server. In evaluating whether the network being tested is vulnerable to protocol manipulation and session theft, the network penetration assessor will determine whether the host server will communicate directly with the attacker, and checks whether the attacking entity is able to trick the client into believing that the original client's session ended normally, so as to not alert any monitoring program that a session had terminated improperly.

Next, the findings generated by the network penetration testing module are used by the data compromise and extraction module to determine whether the networks being evaluated can actually be compromised, and to determine whether data can actually be extracted from those same networks.

Finally, information obtained by running the network penetration module is gathered and compiled into a report by the report generator module. The generated report assesses the effectiveness of the existing controls both in terms of design and operating effectiveness, lists the risks identified, associates an overall level of risk that session theft could occur, and makes recommendations on how to mitigate identified risks.

For example, the generated report may classify and briefly list each of the potential vulnerabilities identified by the disclosed systems and methods, and may associate an intuitive descriptor such as "low risk," "medium risk," "high risk," "informational risk," or "administrative risk" with each identified vulnerability. These risk levels may be further defined. For example, "high risk" may refer to vulnerabilities that could result in the user's system being immediately compromised, which, therefore, should be addressed immediately by the user. "Medium risk" may refer to vulnerabilities that could potentially result in information or system compromise, but which do not warrant immediate attention. "Informational risk" may be a specific category of "medium risk" relating to vulnerabilities that could potentially result in information compromise. "Low risk" (which may be synonymous with administrative risk) may refer to problems or warnings, such as a system configuration that might reveal information that might aid an attacker in their attempt to compromise the user's system or that would otherwise be of reconnaissance interest.

In some examples, an apparatus and methods as disclosed herein may be used as a network security assessing device, including the network penetration assessor, and may be comprised of a data gathering module; a network mapping module; a network evaluator module; a network penetration testing module; a data compromise and extraction module; and a report generator module.

It should be understood that throughout this disclosure, the singular reference may include the plural and the plural may include the singular. For example, "results" may refer to a single result and "data" may refer to a single-discrete item of data, or to numerous items of data. Additionally, conjunctions as used herein are generally used in a conjunctive and not disjunctive sense. For example, "or" carries the same connotation as the logical expression "or" and not the logical expression "exclusive or." Example methods, devices, systems, and materials are described herein, but, as one skilled in the art will recognize, similar or equivalent methods, devices, systems, and materials may be used without deviating from the teachings of the specification. All patents, patent applications or publications referenced herein are incorporated hereby in their entireties, however, any reference to such patents, patent applications or publications should not be construed as an admission that they constitute prior art.

It is to be understood that the terminology used herein is for the purpose of describing particular embodiments only, and is not intended to limit the scope of the present disclosure which will be limited only by the appended claims.

Reference will now be made in detail to example implementations of the systems and methods illustrated in the accompanying drawings. Wherever possible, the same reference numbers will be used throughout the drawings and the following description to refer to the same or like parts.

A typical network and computing environment in which protocols can be attacked and manipulated so as to lead to session theft and credential theft, is disclosed in US 2009/0234972, incorporated herein by reference. For example, as shown in FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106 via one or more networks 104, 104' (generally referred to as network 104).

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104, 104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale, Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the server 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
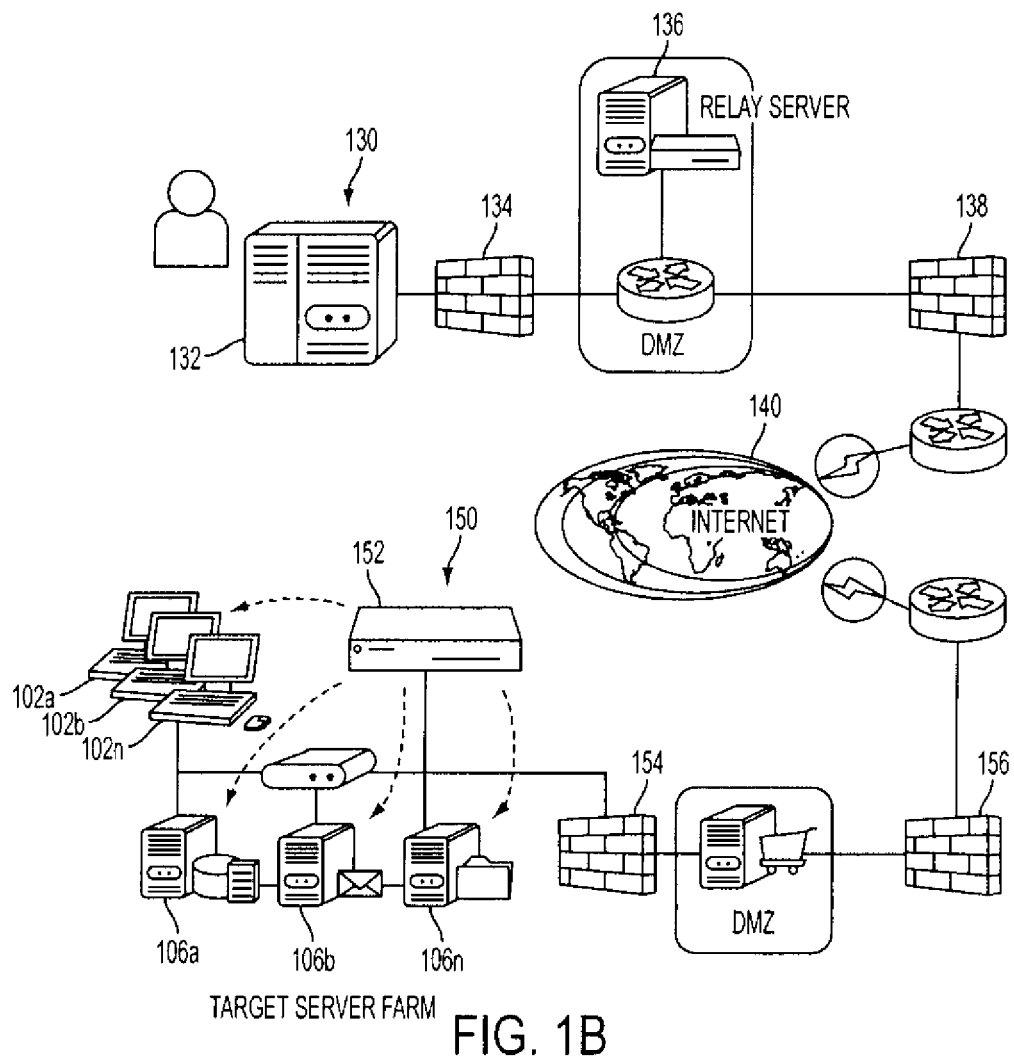
FIG. 1B is an alternative block diagram of an embodiment of a network environment that may be used in conjunction with the disclosed systems and methods.

Referring now to FIG. 1B, an embodiment of the disclosed systems is shown in both remote deployment 130, and in internal deployment 150. In regard to the remote deployment 130 executing the systems and methods described herein, the remote system 132 is deployed behind a firewall 134 and is connected to the relay server 136, which is behind an additional firewall 138, and is ultimately connected to the client's servers 106a-n through the internet 140. Alternatively, the internal deployment 150 may consist of the internal system 152 executing the systems and methods described herein, which is connected to the targeted servers 106a-n, and is connected to the client's devices 102a-n. The internal system 152 is connected to the first firewall 154 and a second firewall 156 before ultimately being connected to the internet 140.

As used herein, the Internet refers at least to a collection of networks and gateways that use the Transmission Control Protocol ("TCP") or Internet Protocol ("IP") suite of protocols to communicate with one another. The World Wide Web ("WWW") refers at least to a set of inter-linked hypertext documents residing on hypertext transport protocol ("HTTP") servers. As used herein, WWW also refers at least to documents accessed on secure servers, such as HTTP servers ("HTTPS"), which provide for encryption and transmission through a secure port. WWW documents, which may be referred to herein as web pages can, for example, be written in hypertext markup language ("HTML"). As used herein, the term "website", or simply "site", refers at least to one or more HTML documents (or "webpages") and associated files, scripts, and databases that may be presented by one or more HTTP or HTTPS servers on the WWW. The term "web browser" refers at least to software and hardware that lets a user view HTML documents and access files and software related to those documents. The systems and methods as disclosed herein be associated with any types of networks and internet networks and may be associated with any types of communication protocols and documents.

Systems and methods in accordance with the disclosure can be implemented using any type of general purpose computer system, such as a personal computer (PC), laptop computer, server, workstation, personal digital assistant (PDA), mobile and/or wireless communications device, interconnected group of general purpose computers and the like, running any one of a variety of operating systems. An example of a general-purpose computer system usable with at least one embodiment of the present disclosure is illustrated in FIG. 2A and FIG. 2B.

Figure 2A:
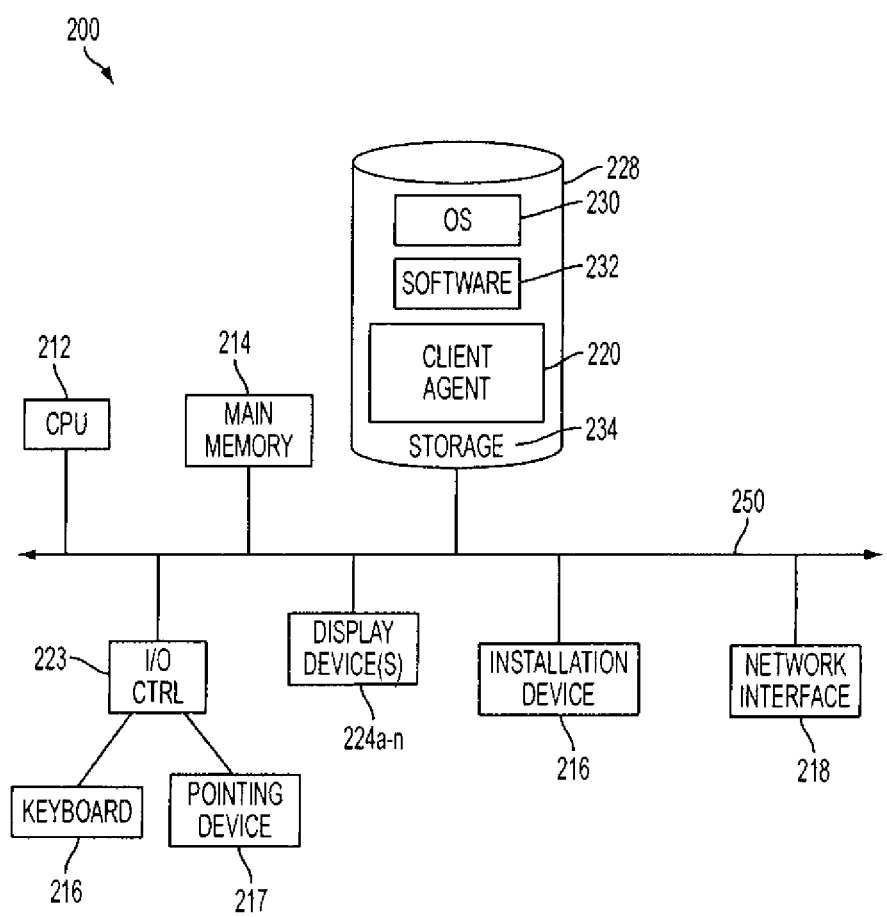
FIG. 2A is a block diagram of a general computer hardware configuration that may be used in conjunction with the disclosed systems and methods.

Referring briefly to FIG. 2A, the general purpose computer system 200, on which the scanning and monitoring system disclosed herein is run, includes a central processor 212, a main memory unit 214 for storing programs and/or data, an input/output controller 223 that can control keyboard 226 and/or a pointing device 227 such as a mouse, a network interface 218, a display device(s) 224a-n, one or more installation devices 216, a memory unit 228 which is memory containing the operating system 230, the application software 232, the client agent 220, and other memory 234, and a data bus 250 which couples these components so as to allow communication there between as well as communication with other computer systems. Such communication occurs either via direct connection, via the world wide web, or via other means of communication such as cable, phone lines, microwave and wireless communication.

Figure 2B:
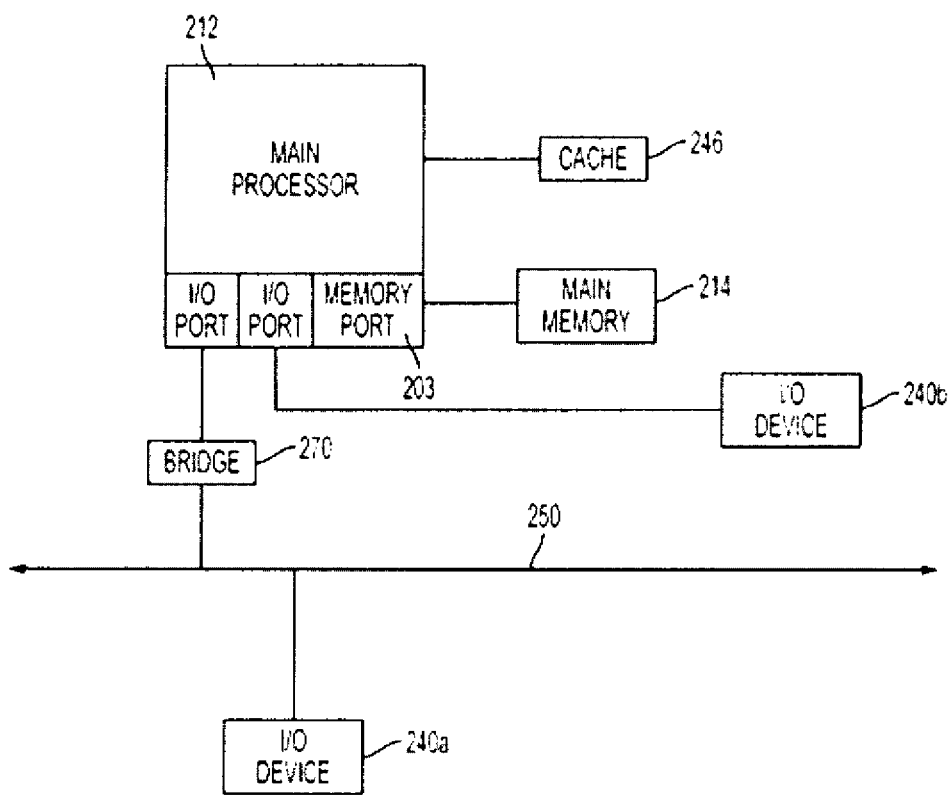
FIG. 2B is a block diagram of a general computer hardware configuration that may be used in conjunction with the disclosed systems and methods.

The computing system 200, may also include additional optional elements as shown in FIG. 2B, such as one or more input/output devices 240a-240b (generally referred to wires reference numeral 240), and a cache memory 246 in communication with the central processing unit 212.

The central processing unit 212 is any logic circuitry that responds to and processes instructions fetched from the main memory unit 242. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein.

Main memory unit 214 may be one or more memory chips capable of storing data and allowing any storage location to be directly accessed by the microprocessor 212, such as Static Random Access Memory (SRAM), Burst SRAM or Synch-Burst SRAM (BSRAM), Dynamic Random Access Memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), Synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 214 may be based on any of the above described memory chips, or any other available memory chips capable of operating as described herein. In the embodiment shown in FIG. 2A, the processor 212 communicates with main memory 214 via a system bus 250 (described in more detail below). FIG. 2B depicts an embodiment of a computing device 200 in which the processor 212 communicates directly with main memory 214 via a memory port 203. For example, in FIG. 2B the main memory 214 may be DRDRAM.

FIG. 2B depicts an embodiment in which the main processor 212 communicates directly with cache memory 246 via a secondary bus, sometimes referred to as a backside bus. In other embodiments, the main processor 212 communicates with cache memory 246 using the system bus 250. Cache memory 246 typically has a faster response time than main memory 214 and is typically provided by SRAM, BSRAM, or EDRAM. In the embodiment shown in FIG. 2B, the processor 212 communicates with various I/O devices 240 via a local system bus 250. Various busses may be used to connect the central processing unit 212 to any of the I/O devices 240, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 224, the processor 212 may use an Advanced Graphics Port (AGP) to communicate with the display 224. FIG. 2B depicts an embodiment of a computer 1002 in which the main processor 212 communicates directly with I/O device 240 via HyperTransport, Rapid I/O, or InfiniBand. FIG. 2B also depicts an embodiment in which local busses and direct communication are mixed: the processor 212 communicates with I/O device 240 using a local interconnect bus while communicating with I/O device 240 directly.

The computing device 200 may support any suitable installation device 216, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 220, or portion thereof. The computing device 200 may further comprise a storage device 228, such as one or more hard disk drives or redundant arrays of independent disks, for storing an operating system and other related software, and for storing application software programs such as any program related to the client agent 220. Optionally, any of the installation devices 116 could also be used as the storage device 228. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 200 may include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 218 may comprise a built-in network adapter, network interface card, PCMCIA network card, card bus network adapter, wireless network adapter, USB network adapter, modem or any other device suitable for interfacing the computing device 200 to any type of network capable of communication and performing the operations described herein. A wide variety of I/O devices 240a-240n may be present in the computing device 200. Input devices include keyboards, mice, trackpads, trackballs, microphones, and drawing tablets. Output devices include video displays, speakers, inkjet printers, laser printers, and dye-sublimation printers. The I/O devices 240 may be controlled by an I/O controller 223 as shown in FIG. 2A. The I/O controller 223 may control one or more I/O devices such as a keyboard 226 and a pointing device 227, e.g., a mouse or optical pen. Furthermore, an I/O device may also provide storage 228 and/or an installation medium 216 for the computing device 200. In still other embodiments, the computing device 200 may provide USB connections to receive handheld USB storage devices such as the USB Flash Drive line of devices manufactured by Twintech Industry, Inc. of Los Alamitos, Calif.

In some embodiments, the computing device 200 may comprise or be connected to multiple display devices 224a-224n, which each may be of the same or different type and/or form. As such, any of the I/O devices 240a-240n and/or the I/O controller 223 may comprise any type and/or form of suitable hardware, software, or combination of hardware and software to support, enable or provide for the connection and use of multiple display devices 224a-224n by the computing device 200. For example, the computing device 200 may include any type and/or form of video adapter, video card, driver, and/or library to interface, communicate, connect or otherwise use the display devices 224a-224n. In one embodiment, a video adapter may comprise multiple connectors to interface to multiple display devices 224a-224n. In other embodiments, the computing device 200 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices, such as computing devices 200a and 200b connected to the computing device 100, for example, via a network. These embodiments may include any type of software designed and constructed to use another computer's display device as a second display device 224a for the computing device 200. One ordinarily skilled in the art will recognize and appreciate the various ways and embodiments that a computing device 200 may be configured to have multiple display devices 224a-224n.

In further embodiments, an I/O device 240 may be a bridge 270 between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 200 of the sort depicted in FIGS. 2A and 2B typically operate under the control of operating systems, which control scheduling of tasks and access to system resources. The computing device 200 can be running any operating system such as any of the versions of the Microsoft®. Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 200 may have different processors, operating systems, and input devices consistent with the device. For example, in one embodiment the computer 200 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Those skilled in the art will appreciate that computer system 200 need not include every element shown in FIG. 2A and FIG. 2B, and that equivalents to each of the elements are intended to be included within the spirit and scope of the disclosure.

In some embodiments of the network penetration assessor system and methods, the systems and methods are part of a client-server system, in which a client sends requests to a server and a server responds to requests from a client. Of course, a "client" can be broadly construed to mean one who requests or gets the file, and "server" can be broadly construed to be the entity that downloads the file. The network penetration assessor system can be either a client system or a server system. In one embodiment, the systems and methods are implemented at the server side and receive and respond to requests from a client, such as a reader application running on a user computer.

The server can be any entity, such as computer system 200, a computer platform, an adjunct to a computer or platform, or any component thereof, such as a program that can respond to requests from a client. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages (ASP), server side include (SSI) functions and the like.

Embodiments of the systems and methods can be implemented using computer technologies such as software applications, computer-readable program media, data structures, carrier wave signals, user interfaces, and application program interfaces. For example, software embodying the disclosed systems and methods in one embodiment, resides in at least one application running on the computer system 200. In at least one embodiment, the systems and methods are embodied in a computer-readable program medium usable with the computer system 200. In at least one embodiment, the disclosed systems and methods are embodied in a data structure stored on a computer or a computer-readable program medium. In addition, in one embodiment, the disclosed systems and methods are embodied in a transmission medium, such as one or more carrier wave signals transmitted between the computer system 200 and another entity, such as another computer system, a server, a wireless network, etc. An embodiment of the disclosed systems and methods also can be embodied in an application programming interface (API) or a user interface. In addition, the disclosed systems and methods may be embodied in a data structure.

As mentioned above, the example methods described herein may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example methods described herein may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Systems and methods for evaluating whether a system is vulnerable to session theft are now described. The first step in carrying out a protocol manipulation attack is accomplishing a preliminary man-in-the-middle attack. As appreciated by one of ordinary skill in the art, the man-in-the-middle attack allows for a form of active eavesdropping in which the attacker makes independent connections with the system being attacked, and relays messages between the client contacting the system or network, and the system or network itself. Importantly, for the attacker to successfully insert itself between the client and the destination system or destination network, the client or user should believe the attacker to be the targeted system or network, and the targeted system or network should believe the attacker to be the client.

Modern network communication is accomplished through the use of protocols. There are different techniques that can be used in conjunction with various protocols so as to achieve man-in-the-middle attacks on networked computers. The widely-adopted Open Systems Interconnect ("OSI") specification breaks these protocols into hierarchical "layers". These layers define the operational scope or reach of the protocols in each layer, and each layer is named after its operation, as each layer has functionality that solves a set of problems relevant in its scope. For example, the "Link Layer" (Layer 2) is the layer that contains the technology used to contact devices on the local network to which the host is directly connected. The Link Layer is responsible for the basic connectivity functions that interact with the network-related hardware of the computer, and the management associated with the interface-to-interface messaging.

Similarly, the "Network Layer" (Layer 3) is responsible for the protocols that operate between multiple links of a computer and manages the interconnection of networks. The Network Layer manages the Internet Protocol, which defines the fundamental addressing namespaces. The Network Layer is used to identify and locate hosts on the network. The "Transport Layer" (Layer 4) manages the direct host-to-host communication tasks, and as such provides a general framework to transmit data between hosts using protocols like the Transmission Control Protocol ("TCP"). The "Application Layer" (Layer 7) contains all protocols that manage the functioning of the data communications services. For example, the Application Layer may manage application-based interactions on a process-to-process level between communicating Internet hosts.

Given these seven layers of protocols available under the OSI model, there are multiple ways for a network to be attacked and an ongoing session to be stolen. For example, Address Resolution Protocol ("ARP") poisoning is a commonly used attack that operates as a bridge between the Link Layer and the Network Layer, in that it allows an attacker to intercept traffic sent between local network hosts. An attack of the Address Resolution Protocol is advantageous to a hacker because it is the protocol that is essential in linking the Link Layer of the system to the Network Layer. Because Address Resolution Protocol has no Network Layer components, it is non-routable and is restricted to a broadcast domain. Accordingly, Address Resolution Protocol requests are often sent as broadcast traffic, while legitimate replies to Address Resolution Protocol requests are unicast. It is well known that Address Resolution Protocol does not perform any identification validations on any transactions carried out by the systems it works with.

In carrying out an attack on a system using Address Resolution Protocol, also referred to as Address Resolution Protocol cache poisoning, the attacker sends out a gratuitous Address Resolution Protocol message to one or many machines on the subnet stating that the MAC address of the target host has changed. The gratuitous Address Resolution Protocol message will typically contain the attacker's MAC address as a substitute. From that point on, the attacker must only forward the intercepted packets, and all packets sent by the client will be delivered to the attacker's system. Such an attack allows the attacker to view the system's connections, and possibly forward those connections to another location for deeper inspection. Accordingly, there is a need to determine whether a given network is vulnerable to session theft by an attacker when the attacker manipulates the network's Address Resolution Protocol.

Another type of attack that networks are vulnerable to, and which could result in session theft, pertains to the Domain Name System ("DNS"), which resides at the Application Layer. As its title suggests, the Domain Name System is a naming system that is built on a distributed database for computers, and even includes any resource that is connected to the Internet, or even connected to a private network. The Domain Name System translates assigned names into hierarchical numerical identifiers that are associated with networking equipment. The reason for translating the assigned names into numerical identifiers is to allow easy location and addressing of the networking equipment on a global scale. Accordingly, the Domain Name System is akin to a global phone book for the Internet, in that it associates domain names assigned to networking equipment by humans (referred to as "hostnames"), into corresponding IP addresses. By way of example, the Oracle database DNS record "oracle11g.windomain.com" is translated into, or associated with the IP address 10.10.1.3.

One variation of the Domain Name System is the dynamically updated Domain Name System, in that it allows client computers to update Domain Name System records, which aid in network administration. Specifically, a dynamic update capability enables Domain Name System client computers to register and update their resource records with a Domain Name System server as needed, such as when a change occurs to the Domain Name, or to its corresponding IP address. Consequently, there is less of a need for manual updating of zone records, especially for clients that frequently move or change locations. The Domain Name System Server service allows dynamic updates to be either enabled or disabled. Moreover, the enabling and disabling of the dynamic updates can be controlled on a per-zone basis at each server, where each server can be configured to load either a standard primary or directory-integrated zone. As recognized by one of ordinary skill in the art, the Domain Name System Client service will dynamically update host resource records in Domain Name System when configured as such.

One problem with dynamic update of the Domain Name System is that many of the devices that are integrated with the program that performs the dynamic update of the Domain Name System (i.e., Active Directory), frequently allow unsecured dynamic updates for Domain Name System records. For example, Microsoft Domain Name System servers, Windows 2000 and newer versions of Windows software, are integrated with Active Directory. Accordingly, these systems allow an attacker to create, modify or delete Domain Name System records without proper credentials. Although the server can be configured to block DNS updates from unauthenticated users, a problem still exists because an attacker can make himself appear to be an authorized user.

Moreover, although newer versions of Windows operating software (e.g., Windows 2003) contain protections against allowing malicious updates to the Domain Name System, an attacker could still gain access to privileged traffic by simply modifying the Oracle database Domain Name System record "oracle11g.windomain.com" to point to 10.10.1.199 instead of its true IP address 10.10.1.3. From that point forward, the attacker could view the Oracle network connections and all data sent between clients and the server. Accordingly, there is a need to determine whether a given network if vulnerable to session theft by an attacker when the attacker manipulates the network's Domain Name System.

Another type of protocol that is vulnerable to malicious attack and session theft is the Dynamic Host Configuration Protocol ("DHCP"). As understood by one of ordinary skill in the art, Dynamic Host Configuration Protocol operates on the Network Layer, and is a protocol used to automatically configure computers and other devices that are connected to Internet Protocol networks. Allowing a device to automatically configure to a network eliminates the need for a network administrator to configure the newly added device. Dynamic Host Configuration Protocol also provides a central database for keeping track of computers that have been connected to the network. This central database of all the devices connected to a given system eliminates the potential for two devices to be assigned the same Internet Protocol address.

Although Dynamic Host Configuration Protocol provides convenience to the system administrator, it also allows a malicious attacker to gain unauthorized access to the network, which could result in session theft. For example, an attacker with local access might place an unauthorized device on the network and configure it to act as a rogue DHCP server. From that point forward, as authorized clients connect to the network, the rogue server can provide authorized devices with its own Internet Protocol addresses as well as incorrect values for local resources such as gateways, Domain Name System servers, and other trusted network services. Importantly, if the rogue Dynamic Host Configuration Protocol device is configured to provide an Internet Protocol address of a device controlled by the attacker as a default gateway, the attacker will be able to monitor and eavesdrop on all the traffic sent by the system's clients to other networks.

While using the rogue Dynamic Host Configuration Protocol server, the attacker may gain access to the systems connections and potentially all traffic sent by its clients. Accordingly, there is a need to determine whether a given network if vulnerable to session theft by an attacker when the attacker manipulates the network's Dynamic Host Configuration Protocol.

Yet another type of protocol that is open to attack and session theft is the Link Layer protocol that manages Access Point ("AP") or Wireless Access Point ("WAP") devices. For example, a Wireless Access Point is used to interconnect other wireless devices in another network, such as a Local Area Network ("LAN") or the Internet. As understood by one of ordinary skill in the art, one type of rogue Access Point could be a router or other type of device that had been innocently installed on a company's secure network, but without the local network administrator's authorization or knowledge. Rogue Access Points of this type are dangerous for an organization because they can potentially allow unauthorized users to gain access to the company's secure system. Similarly, a rogue Access Point could have been established on an open network that is typically used by the general public, by maliciously installing a wireless device, such as a router, on that system. The purpose of this type of rogue Access Point is to gain access to the internal operation of the network being attacked.

Malicious users typically attack a network using Access Point protocol attacks by first creating a fake Access Point that possesses the same Extended Service Set Identified ("ESSID") as the Access point being targeted. This is often accompanied by a "Disassociation Attack" where the attacker sends a specially crafted packet that appears to come from the real access point, in order to cause the client to re-associate with the attacker's own Access Point.

When the attacker successfully convinces a victim to establish a connection using the rogue Access Point, the attacker gains access to all data sent between the client and any destinations that are accessible through the attacker's link. Accordingly, there is a need to determine whether a given network is vulnerable to Access Point attacks and session theft by an attacker when the attacker manipulates the network's Wireless Access Point devices and the corresponding protocols.

As described above and in accordance with known systems, there are several types of protocol that are vulnerable to attack that could lead to session stealing. The various embodiments of the systems and methods that are described herein allow a network to be evaluated in terms of its vulnerability to session theft, and provide the results of that evaluation to the network's manager.

Figure 3:
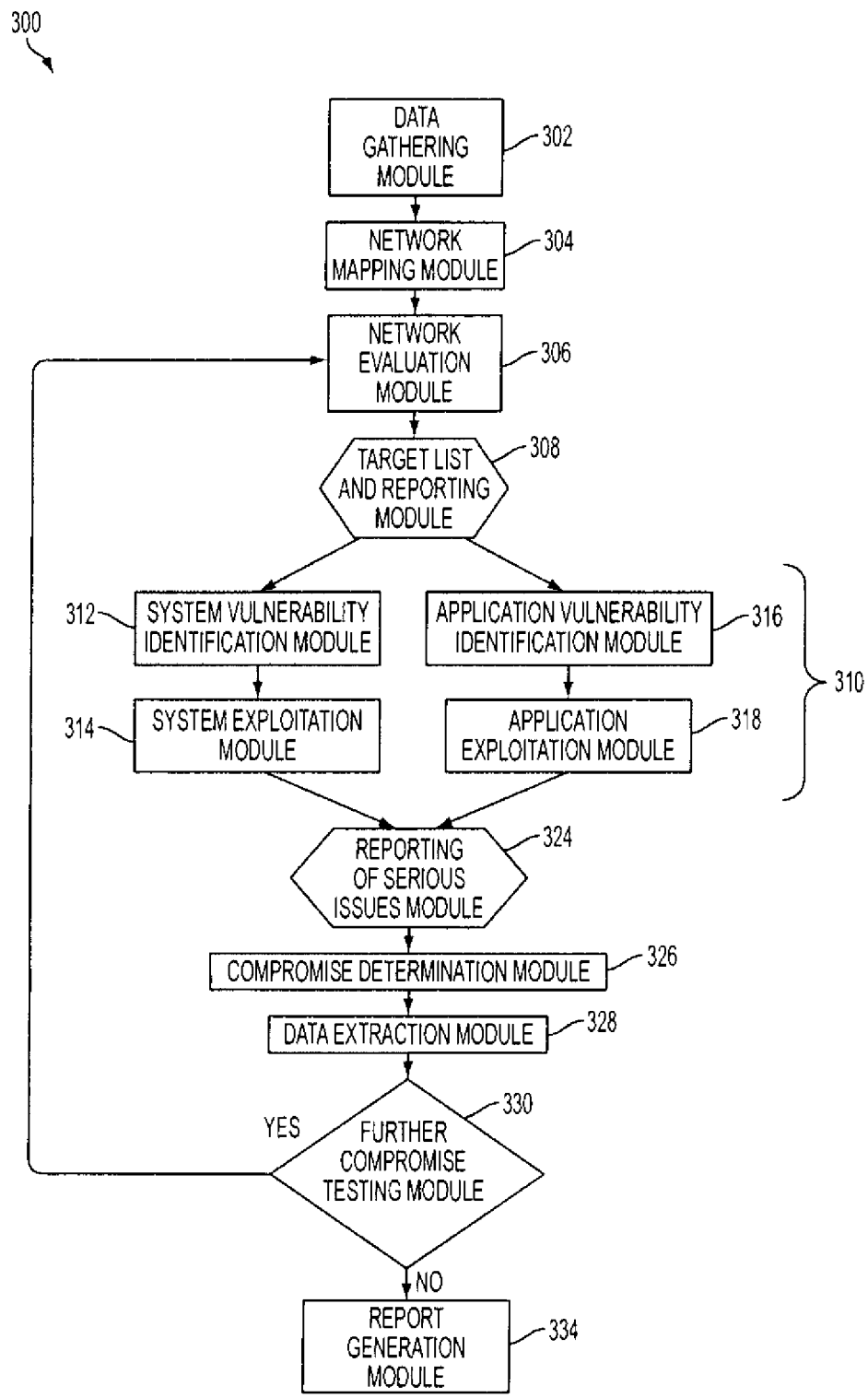
FIG. 3 is a diagram illustrating the network penetration assessor according to an embodiment of the disclosed systems and methods.

FIG. 3 depicts an example embodiment of the network penetration assessor system 300 that determines whether a network is vulnerable to session theft. As shown, for example, in FIG. 3, an embodiment of the network penetration assessor 300 may include a data gathering module 302, a network mapping module 304, a network evaluator module 306, a target list and reporting module 308, a penetration testing module 310, a reporting of serious issues module 324, a compromise determination module 326, a data extraction module 328, a further compromise testing module 330, and a report generator module 334.

In the course of operating the apparatus of the present embodiment in accordance with known systems, the user begins by running the data gathering module 302. User data may be supplied to the data gathering module 302 manually and/or automatically. The user data gathered by the data gathering module 302 may include the IP address for the network or system being tested, the netmask, the default gateway, the primary internal DNS, the secondary internal DNS, and the IP address ranges of the networks being evaluated. Additionally, if the testing is being performed internally, the number of stores or small office locations that will require testing in addition to the number of data centers that require testing can be input into the data gathering module 302. The types of modes for inputting the user data into the systems and methods described herein are similar to those discussed in U.S. application Ser. Nos. 10/401,040, 10/400,924, and 10/976, 181, which are incorporated herein by reference.

Additionally, if the network penetration assessor system 300 is being run with the intent of determining whether the network being evaluated passes certain certification standards, for example the PCI-DSS standard, then in accordance with known systems the information necessary to test for compliance with that standard is also gathered by the data gathering module 302.

Moreover, the data gathering module 302 may be adapted in accordance with known systems to use the information provided by the user or the system to infer a set of tests to be performed that probe for specific vulnerabilities. Such tests can be inferred, for example, by first identifying the operating framework the user seeks to assess compliance against. Then the parameters that need to be tested or probed for a given operating framework are placed in a look-up table such as a "Decision Tree", which is indexed by the operating framework. In one aspect of the systems and method described herein, any "new" information generated as a result of the performed tests may cause additional scanning modules to be employed. Such scanning modules may be modules that are known and understood by one of ordinary skill, and as described in U.S. application Ser. Nos. 10/401,040, 10/400, 924, and 10/976,181, which are incorporated herein by reference. Additionally, the identification of a particular operating framework may serve to aid in deciding the appropriate format of the report to be generated.

Once the data gathering module 302 is complete and the network penetration assessment system 300 has sufficient input to allow it to determine what tests need to be run, the network mapping module 304 begins in accordance with known systems. The network mapping module 304 may operate differently depending on whether the penetration assessment testing being performed is external or internal. For external penetration testing, the network mapping module 304 typically will obtain the network blocks from the party being tested. This is typically in the form of a block of Internet addresses provided by one or many Internet Service Providers ("ISPs"). These addresses are then probed to determine whether or not they are in use. This probe is optionally executed three times, and at different intervals during testing to ensure that no system is missed. The data gathered is used to create a network map of the external environment.

For internal penetration testing, the network mapping module 304 begins by passively obtaining the internal IP address space of the network being tested through manual investigation and traffic captures performed on the internal network. The information generated by the network mapping module 304 includes findings regarding network broadcasting, dynamic routing updates, CDP messages, SNMP polling. This information is used to generate information about the topology of the network being assessed. Furthermore, the network mapping module 320 may use active techniques in accordance with known systems that include Layer 2 (ARP) pings of the local net, as well as conducting port scanning of more remote internal segments.

When analysis by the example network mapping module 304 is completed, a fairly comprehensive logical map of the internal network environment of the network being tested will have been generated.

Next, the network penetration assessment system runs the network evaluator module 306. First, in accordance with known systems, the network evaluator module 306 conducts another probe of the systems in the network mapping module 304 using TCP finger printing, service fingerprinting, and/or other methods known to one of ordinary skill in the art to identify and classify systems and services. The data gathered by the network evaluator module 306 is used to classify the systems by function. Data gathered about the network being tested aids in determining the classification of the network. For example, a system running a particular version of the Apache Web Server as well as BEA Web logic is most likely a web application server, and is classified as such. After each system on the network being evaluated is classified, the network map is updated to reflect each system's functionality and operation system.

Using the information generated by the network evaluator module 306, the target list and reporting module 308 is run in accordance with known systems to facilitate informing the key security officer of the entity being evaluated of the system findings, as well the intended target list to be used in the penetration testing so that the key security officer knows which networks and servers are to be tested and probed. Such information allows the key security offer to ensure that the testing and probing does not interfere with the normal operation of the networks and servers being tested for vulnerabilities to attempts at network penetration.

Next, the network penetration testing module 310 is executed. The network penetration testing module 310 is comprised of several submodules entitled: the system vulnerability identification module 312, the system exploitation module 314, the application vulnerability identification module 316, and the application exploitation module 318, each of which is described in turn below. Importantly, when running the network penetration testing module 310 in regard to internal penetration testing only, attention must be paid to the low level network parameters. Specifically, the network penetration testing module 310 will evaluate all of the discovered network architecture, and attempts will be made to bypass the controls in place. By way of example only, network penetration testing module 310 will attempt to bypass the Switched Networks, the VLANS, the Segmentation, the ACL's, the internal firewalls, and the 802.11x (NAC) authentication mechanisms using Layer 2 based attacks such as ARP Cache Poisoning, VLAN Hopping, or low layer attacks involving dynamic failover protocols, Multicast groups, VLAN and Dynamic Trunking, and other techniques.

The network penetration testing module 310 begins its operation by first testing the systems on the targeted network or networks. This is accomplished in accordance with known systems by first running the system vulnerability identification module 312, which first probes each host on the network being tested, as well as all the associated listening services of those hosts. This probing is conducted both singularly and in tandem with the other hosts to locate potential vulnerabilities. The probes used, along with the results of the probes, are cataloged so as to identify all the potential attack vectors that might be exploitable.

Then, the system exploitation module 314 uses the results generated by the system vulnerability identification module 312 to attempt to exploit the network being evaluated. In exploiting the various identified vulnerabilities, the system exploitation module 314 attempts to either gain unauthorized access to the system identified as vulnerable or extract sensitive data from it. The system exploitation module 314 is deemed to have successfully exploited a vulnerability if it is able to either gain unauthorized access to the system identified as vulnerable, or actually extract sensitive data from it. The results generated by the system exploitation module 314 are collected in the reporting of serious issues module 324 for future reporting to the security officer.

The network penetration testing module 310 continues its operation by next testing each of the applications residing on each of the systems present on the network being tested. This is accomplished in accordance with known systems by first running the application vulnerability identification module 316. Specifically, the application vulnerability identification module 316 retrieves the classifications previously generated in the network evaluator module 306, and, using those classifications in conjunction with known fingerprints for common applications, identifies the specific applications running on each of the systems identified by the network mapping module 304. Importantly, when an application server is identified, other systems will be identified within an application server group. This grouping helps identify potential flaws in application trust relationships. Determining these groupings and identifying these potential flaws is vital to the successful identification of the vulnerabilities of the identified applications. Moreover, in addition to identifying purposeful applications, the application vulnerability identification module 316 attempts to discover Trojan horse type applications as well as backdoor types of applications that may be present in the network being tested.

Next, the application exploitation module 318 uses the results generated by the application vulnerability identification module 316 to attempt to exploit the network being evaluated. In exploiting the various identified vulnerabilities, the application exploitation module 318 attempts to perform various known attack functions including: Input Validation, Buffer Overflow Cross Site Scripting, URL Manipulation, SQL Injection, Hidden Variable Manipulation, and Cookie Modification. The results generated by the application exploitation module 318 are collected in the reporting of serious issues module 324 for future reporting to the security officer.

After the reporting of serious issues module 324 is run and a corresponding report is generated, the compromise module 326 is run. As explained in greater detail below, the compromise determination module 326 performs the steps identified in the application exploitation module 318 and in the system exploitation module 314 in order to prove or disprove the suspected vulnerability, and the security officer for the network being evaluated is notified as to each instance of compromise. Importantly, when exploitive software possibly originating from malicious sources is identified by the compromise determination module 326, the owner of the network being evaluated is provided the opportunity to decide if the particular system should undergo additional tests. If the owner of the network decides to perform additional testing, the compromise determination module 326 utilizes additional techniques to further penetrate the systems and applications identified by the system vulnerability identification module 312 and identified by the application vulnerability identification module 316, respectively. In doing so, the compromise determination module 326 can perform functions that are typically performed by password cracking tools, a network sniffer, and the use of remote management tools.

Successful execution of the compromise determination module 326 establishes a launch point for additional attacks against the network.

Next, the network penetration assessment system 300 runs the data extraction module 328 to determine whether the identified vulnerabilities allows for the extraction of data from the network being evaluated. Specifically, the data extraction module 328 tests each system and application that had been compromised by the compromise module 326, and examines each system and application for the existence of critical data and files. If the data extraction module 328 finds such data to be accessible, a sample of this data could be downloaded from the network being evaluated and securely stored by the gathered data extraction module 328, until the network penetration assessment system 300 presents the findings to the security officer.

Then the network penetration assessment system 300 prompts the operator to decide whether the further compromise testing module 330 should be run. The reason for running the further compromise testing module 330 is because there are many trust relationships that can be potentially exploited, or data exposed through a compromise, that might lead to the compromise of additional systems and applications. Using the data collected by the gathered data module 328, and using the techniques similar to those used by the network mapping module 304 to develop the network map and system classification, the network penetration assessment system 300 could launch a new stage of discovery against the environment by starting the process all over again by running the system classification and identification module 306, using the previously identified compromises as a starting point. For example, if a web server is compromised by the network penetration testing module 310, the network penetration assessment system would then determine whether the access can be gained to a system on the internal network for data storage and retrieval. This internal server can be potentially compromised if vulnerabilities exist that can be exploited from the web server. This tactic is commonly referred to as "pivoting" and is carried out by installing a set of tools on the compromised server to further penetrate other systems that are accessible from its network location. Internal resources such as database servers often have trust relationships with externally-facing devices that can be leveraged in this manner.

If the operator and/or the security officer decide that no additional compromise testing is necessary, the final report development and delivery module 334 is run in accordance with known systems. The report generated by this module may contain an executive discussion of the overall findings, as well as a more specific discussion of the technical findings of the tests performed. The report may detail any identified threat or vulnerability or potential vulnerability, as well as recommendations for countermeasures to eliminate or mitigate those threats or vulnerabilities. If possible, the report may also recommend specific remediation steps, and/or architectural configuration, or procedural changes that may be required to eliminate the identified threats or vulnerabilities. Any files, passwords, or system information obtained during the test will be included as part of the report deliverable.

The final report development and delivery module 334 may also generate a report containing an assessment of the effectiveness of the existing controls both in terms of design and operating effectiveness; an identification of the testing work papers; the risks identified; all security risk mitigation recommendations based on the review of the identified threats and vulnerabilities; the overall risk level rating of the test environment; and a discussion of the test activities performed to arrive at the overall rating. The report may be made available in whatever format is most advantageous, such as PDF format, and can be obtained via the secure customer portal, or can be sent via encrypted email.

The deliverable may also include archiving the report in a secure customer portal. Moreover, the information used to compile the report, as well as the report itself may be removed from any attack platforms used during the clean-up phase of the evaluation.

As discussed above, the network penetration session system 300 tests a given network for certain system and application vulnerabilities. Of specific concern to some of the systems and methods discussed herein, is vulnerability to protocol manipulation resulting in session theft. Provided below is a more detailed description of how the network penetration session system 300, and in particular the compromise determination module 326, discussed above, evaluates a subject network for those vulnerabilities.

By way of example, FIG. 8, in conjunction with the explanation below, describes the operation of the compromise determination module 326 in greater detail so as to determine whether the network being assessed is vulnerable to session theft. The compromise determination module 326 begins by first executing the session identifier module 802 so as to identify the existence of a session. Although the description herein focuses on Transmission Control Protocol ("TCP"), the processes described below are applicable to other protocols that communicate using sessions. These sessions may be maintained at Layer 4, but could also be maintained higher in the OSI model. Transmission Control Protocol is a Transport Layer protocol that is employed by a vast number of network applications. A central property to Transmission Control Protocol is that it establishes a "session" or a predictable connection between the two parties where the first party not only sends data to a second party, but the second party acknowledges every piece of data received from the first party. This process is then repeated by the first party upon receiving data from the second party. The some systems and methods described herein identify sessions that are vulnerable to theft by a malicious user.

Figure 4:
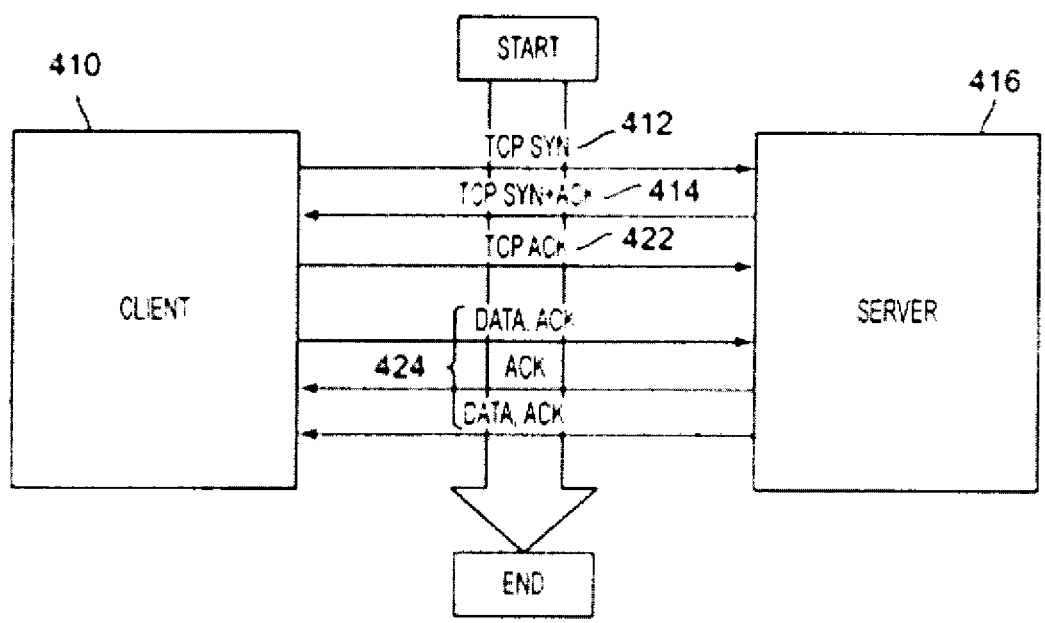
FIG. 4 is a diagram illustrating the establishment of a session as used by an embodiment of the disclosed systems and methods.

As illustrated in FIG. 4, and in accordance with known systems, in order to establish a session between a client and a host, both parties must initially exchange certain packets of information during the handshaking process. A Transmission Control Protocol handshake is typically performed by employing the following steps. First, the client 410 sends a Transmission Control Protocol packet 412 with the SYN flag set to Server. Second, the server 416 replies with a Transmission Control Protocol packet 414 with the SYN and ACK flags set. In this way, the server 416 acknowledges the communication request by the client 410. Third, the client 410 sends a Transmission Control Protocol packet 422 with the ACK flag set to Server, thereby completing the "three-way handshake" between the client 410 and the server 416. Once the handshake is complete, the two devices will begin to send data 424 between each other.

Figure 5:
FIG. 5 is a diagram of illustrating the determination of a given port as used by an embodiment of the disclosed systems and methods.

As shown in FIG. 5, in accordance with known systems, established sessions between a client and the server differentiate themselves from other sessions between the server and other clients, or between the client and other servers, by the use of port numbers. Port numbers are a numeric representation for the origination and destination site on each side of a connection. Before establishing the session, a client chooses a number to be assigned to its source port. This number is a 16-bit unsigned integer and can be any value between, for example, 1 and 65535 (typically, not 0 as it is reserved). The client then contacts the server on the number the server selected as its service port, which the client recognizes as the destination port. For example, when the client 510 establishes a web session with a webserver associated with the DNS address www.google.com, the client 510 may select for its Source Port (520) the number 44753, while the server 530 uses as its Source Port (540) the number 80, which is a commonly used value for the protocol in use (HTTP). Thus, when the client is sending information from its Source Port (520) numbered 44753, it knows to send that information to the server 530 on Destination Port (560) numbered 80.

A number of extensions have been added to Transmission Control Protocol since it was standardized in 1981. These extensions are used to change certain behaviors of Transmission Control Protocol, with the common intent of increasing performance of the server's operation. Extensions were also added to Internet Protocol so as to also increase its performance. For purposes of describing the embodiments of the present systems, it is important to appreciate that these extensions could be added to the Transmission Control Protocol as well as to the Internet Protocol.

As shown in FIG. 4, after the handshaking is complete, the session between the two hosts is maintained in a synchronized fashion. The synchronization between the two parties to the session is accomplished by the Transmission Control Protocol employing both sequence and acknowledgement numbers. Specifically, when the client 410 sends a packet to the server 416 during an established session, that packet includes a value for the sequence and a value for the acknowledgement, with each number set to its most recent value. A sequence number can initially be set to a value, preferably a random value, by each host. This sequence number is sent during the initial handshake between the client and the host. The host transmits to the client an acknowledgement including a sequence number determined by adding the sequence number sent by the client with the length of the packet sent by the client. The acknowledgement number is used by the party receiving the data packet, to acknowledge the number of bytes of data received from the sender. The next packet transmitted by the client includes a sequence number identifying the sequence number received in the previous acknowledgement (i.e., the sum of the previously transmitted sequence number and the length of the packet in which that sequence number was transmitted). The next sequence number may be tracked by the client and/or may be determined from the last acknowledgement received by the client.

For example, a first packet transmitted from the client to the server may include a sequence number of 1 and a length of 725. The acknowledgement from the server to the client will include a sequence number of 726 (i.e., 1+725). The second packet transmitted from the client to the server will include the sequence number 726. While an example algorithm for sequence number determination is described any algorithm may be used.

In a typical exchange of data, as exemplified by FIG. 4, the client 410 initiates the handshake procedure with the server 416, and, in doing so, sets the initial sequence number to 10. The server 416 responds to the handshake request by acknowledging the sequence number set to 10, and by setting its own sequence number to the value 50. Next the client 410 sends a packet of data that contains 30 bytes by using sequence number 10. Then the server 416 sends its acknowledgement number set to the value of 40 (which is the sum of the initial sequence value set to 10+the value 30 representing the 30 bytes of data transmitted). All future data transmitted between the client 410 and the server 416 continues in this mode.

Although the above description points out how a session operates normally, a hacker may be able to take over a session and inject malicious data into the session by first learning the format of the packets exchanged, and then manipulating the confines of those packets. For example, in situations where the hacker has access to a Transmission Control Protocol session via a man-in-the-middle attack, malicious data can be injected into the session by injecting packets through the manipulation of header data. The described example embodiments of the network penetration assessor 300, and more specifically, the compromise determination module 326 determines whether the system being evaluated is vulnerable to malicious session injection. Moreover, the example network penetration assessor system 300 makes that assessment for a number of different protocols.

When testing for vulnerability to session stealing, the compromise determination module 326 and more particularly the session identifier module 802 will analyze system vulnerability and application vulnerability by using a sniffing application that is placed between the client and the server. Once the sniffing application is launched, it monitors and analyzes network traffic. As the sniffing application gathers data, it is able to discern between different sessions, and identify those sessions. For example, the sniffing application can detect a new session being initiated by analyzing the packet and determining it contains a data stream similar to the one shown in FIG. 6, in that the initiator's packet 602 contains the "S" 604 symbolizing SYN, the recipient's packet 606 contains the "S" 608 and "ack" 610 and the initiator's packet 612 contains the "ack" 614.

When this pattern of S, S+ACK, and ACK appears, the sniffing application will create a session record, and data pertaining to that session is stored in the session record. The data in each session typically includes: i) a timestamp of the start of the session, or the first observation of an existing session; ii) the address associated with the client; and iii) the address associated with the server.

Similarly, the example session identifier module 802, executing the sniffing application, also determines the existence of an existing session. Typically, existing sessions are detected by the sniffing application determining the existence of acknowledgement ("ACK") packets being exchanged between two devices. Importantly, the originator of the session cannot be determined once a session has already been established, and therefore determining the originator of the session is inferred. The example network penetration assessment application 300, and in particular the example compromise determination module 326 may make the inference by evaluating the port number used by each device as explained below in the port estimation module 804 and the port validation module 806.

The example port estimation module 804 makes its determination of the port number by making an educated estimation. More specifically, the example port estimation module 804 uses a look up table that lists the ports for well-known services, and determines the source of an on-going session based on the ports used by each side of the session. By way of example only, if Device A is using port 80, and Device B is using port 30453, then the system estimates that Device B is likely to be the source because it is well known that port 80 is used by HTTP for providing web traffic. By comparison, port 30453 is a more obscure port that is not commonly used by a source of web content (e.g., a server). Other well-known ports and their corresponding protocols include SMTP (25), POP3 (110), and Telnet (23). The example port estimation module 804 reads from a configuration file that lists well-known ports in order of preference. When a number in the "port list" matches a number being used in an existing session, that number is used to denote the port used by the server. Then, the unmatched port from that session is designated as the source of the session. By making these designations, the network penetration system 300 reduces the chance that a conflict will occur in the event that two well-known port numbers are identified inside of the same session.

Figure 7:
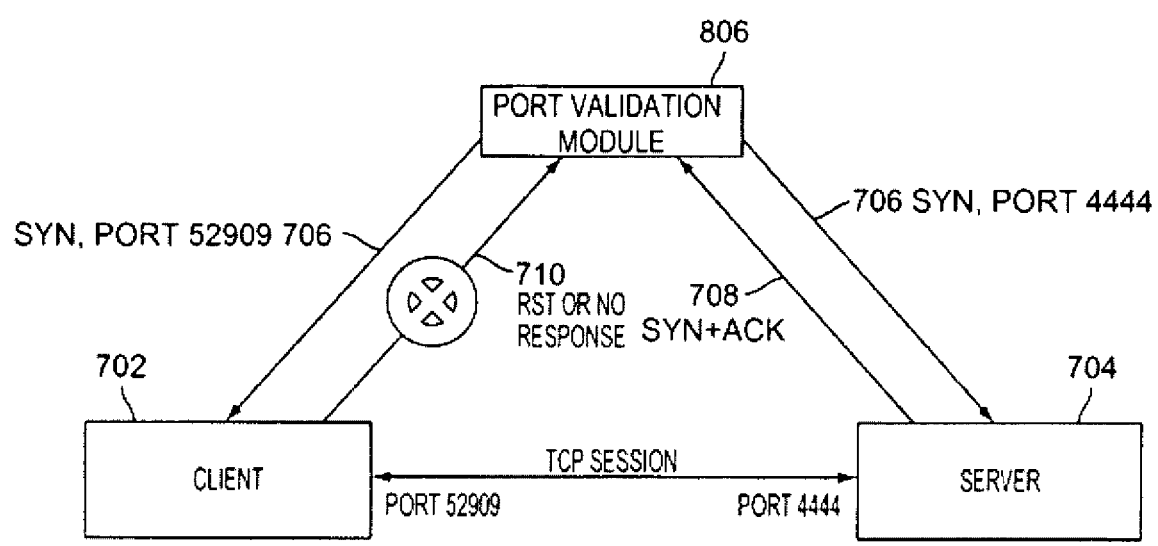
FIG. 7 illustrates the establishment of a false session as used by an embodiment of the disclosed systems and methods.

In another embodiment of the compromise determination module 326, as shown in FIG. 7, the port validation module 806 can alternatively be used to determine the source of an existing session. The port validation module 806 can perform a test of each port being used in a given session. By way of example, the port validation module 806 is positioned between and actively monitors the session between client 702 and server 704. In the existing TCP session occurring between client 702 and server 704, client 702 uses Port 52909, and server 704 uses Port 4444. The port validation module 806 sends a SYN request 706 to both ports used in the session (52909 and 4444). The response, or lack thereof, indicates which port belongs to the server 704. Specifically, if one of the ports receiving that SYN request 706 is a server, it will likely respond to the connection request with a SYN+ACK packet 708. By comparison, a client 702 will typically not respond to the SYN request (see reference numeral 710). Thus, the device associated with the port that responds affirmatively to the SYN packet is very likely to be the server, and will be the target of the session stealing attempt.

Another embodiment of the compromise determination module 326 employs both the port validation module 806 in conjunction with the port estimation module 804. For example, the port validation module 806 could be used to identify the likely source of the session, and that identified port could be compared to the well-known ports in the port list table. In doing so there is an even higher likelihood that the port of the session initiator will be identified.

The example session tracking module 808 is then executed, and uses the data generated from running the example port estimation module 804 and/or the example port validation module 806 to create a data structure that contains certain information for a given session, including the client's IP address, the Client's port address, the Server's IP address, and the Server's port address. The data may also contain various aspects of the current state of the session, so as to allow future injection into the ongoing session. According to the illustrated example, this information is stored using the following format: i) Client's IP; ii) Client's Port; iii) Server's IP; and iv) Server's Port.

In order to maintain the session once it has been taken over, the example compromise determination module 326 running the tracking module 808 must also track the sequence numbers associated with both sides of every Transmission Control Protocol session. In order to accomplish this task, the session tracking module 808 will first attach a field to both the Client sequence number and the Server sequence number for each session. The session tracing module 808 accomplishes this by incrementing the sequence number of the latest packet by the number of data bytes sent in that packet. Importantly, the example session tracking module 808 performs this accumulation step for each packet gathered. By way of example, the accumulation step can be carried out by the following instruction, which demonstrates the action taken when a client sends a packet: $session→{client_seq}=$tcp_obj→{seqnum}+$len.

The session tracking module 808 is also responsible for comparing incoming packets against criteria specified by a template for "sled" creation. The sled is a term associated with a collection of injected data (e.g., malicious data) that will be inserted into a packet and ultimately sent to a server being attacked. Depending on the protocol being used, the session tracking module 808 uses programmed instructions, including pattern matching and value comparisons, to find packets that could be used to impersonate a user through the data modification module 812. When a matching packet is observed, the packet is stored as part of the session record.

Next, when prompted by the user, the compromise determination module 326 terminates the client's involvement in the session by running the client termination module 810. This termination of the original client session can be carried out by any number of methods, such as by employing the resetting submodule, the multiplexing submodule, or the blocking submodule. These methods are unique for the purpose of taking over a session. Each is described in turn.

In the resetting submodule, once the session has been taken over by the malicious user, the client's connection to the server can be terminated by sending a FIN or RST packet to the client. By sending a FIN or RST packet to the client, the client will not be aware that its session had been taken over by the malicious user. Instead, the client will believe that the true server had terminated the session for a specific reason. By terminating the session in this way, the client may not be aware that any malicious activity had occurred.

In the multiplexing submodule, the malicious user preserves the session but simultaneously changes the sequence and acknowledgement numbers. The multiplexing module changes the sequence and acknowledgement numbers to ensure that the impersonated host continues to send data while the multiplexing module simultaneously injects data into the session. It must be appreciated that the Application Layer data must be considered when "sharing" the connection between the original host and the malicious entity acting as the host, because a change in the Application context could affect both the original host and the malicious user, which would result in odd client behavior.

In the blocking submodule, the malicious user simply drops all incoming packets from the impersonated host. This can cause noticeable latency on the client side, but could also be attributed to a network outage. Client software is often designed to attempt reconnection automatically when this situation occurs, and the outage is therefore unlikely to be noticed by the end user. The blocking submodule represents the most lightweight and easiest method of handling the client during impersonation and client termination.

Next, the compromise example detection module 326 executes the example data modification module 812. The packets originally sent by the client are modified so as to: i) contain malicious instructions and/or data; and ii) appear as if they contain safe data sent by the now terminated client. The data modification module 812 is an important aspect of the compromise determination module 326 because it preserves the unique aspects of the Transmission Control Protocol Session, thus fooling the Server to believe that it is still communicating with the original Client. The data modification module 812 is discussed in greater detail below.

Next, the example finalization module 814 finalizes the packet to be set to the Server so that the Server will operate as if it were still in communication with the original Client. The finalization module sets the length, sequence and acknowledgement numbers in the packet that will then be sent to the Server. By way of example, once the modification module 812 has been executed and the data in the packet has been modified, the finalization module 814 computes the latest sequence number for each host by adding the last data packet length to the last observed sequence number as discussed above. By doing so the malicious packet is synchronized with the connection. The finalization module 814 also recomputes the IP layer length field. The following code demonstrates the steps conducted in the finalization module 814:

```
$tcp_obj->{seqnum} = $session->{client_seq};
$tcp_obj->{acknum} = $session->{server_seq};
$tcp_obj->{data} = $data;
$ip_obj->{data} = $tcp_obj->encode($ip_obj);
my $ip_pkt = $ip_obj->encode;
```

The perl module, NetPacket, which is available on CPAN, contains the code for the "encode" function above.

The example network compromise determination module 326 then runs the session takeover module 816, which begins its operation after the finalization module 814 is complete. The session takeover module places the first injection packet, which had been altered by the data modification module 812 and the finalization module 814, on the wire so that it could be transmitted to the Server.

Once the injection packet is accepted by the host Server, the injected software will perform its operation. The session takeover module 816 is similar to the data extraction module 328 in that, after the Server performs the operation called for by instructions contained in the malicious packet, the Server provides that data or information to the malicious client. The malicious client must acknowledge the returned data or information using the correct acknowledgement number so as to keep the session active. After this point, the malicious client would continue the session until it had received the sought-after information.

By way of explaining the insertion of malicious data into the packet by the example data modification module 812, it should be noted that the example compromise determination module 326 described herein can operate over a variety of protocols. As described herein, in order to steal an on-going session, the attacker does not need to have credentials recognized as valid by the network he is attempting to hack into. Moreover, the attacker does not need to know intricate details of the protocol being used by the network to communicate with the client in order to steal an on-going session. Thus, the compromise determination module 326 described herein determines whether the protocol being tested is vulnerable to attack, by an attacker potentially lacking valid credentials. And the example compromise determination module 326 described herein determines whether the network protocol being evaluated is vulnerable to session stealing even when the attacker does not know intimate details of the protocol because the protocol is proprietary.

An example of a system running a proprietary protocol is an Oracle system. It is well known that the Oracle client and server communicate over a variety of proprietary protocols. The foundation for Oracle data transmission is known as the Transparent Network Substrate ("TNS") protocol. Although the Transparent Network Substrate protocol is proprietary, because it is so widely used in the industry, and because it is fairly limited in its scope, certain aspects of this protocol are known. During its operation, Transparent Network Substrate protocol provides the length of the packet being transmitted, an optional checksum, and a type of descriptor for payload data. Although Oracle's Transparent Network Substrate ("TNS") protocol can transmit other data as well, that other data is not discussed in this example.

The Net8 protocol is the primary method used by Oracle to transmit application data, such as queries and responses, and is delivered on top of the Transparent Network Substrate protocol. Because the Net8 protocol is also proprietary, very little detailed information about Net8 protocol is publicly known. Although the proprietary nature of the Transparent Network Substrate protocol and the Net8 protocol have caused those of ordinary skill in the art to consider these protocols to be resistant to tampering, because the example compromise determination module 326 described herein facilitates identification of session stealing vulnerabilities in the Transparent Network Substrate protocol and the Net8 protocol. Thus, the systems and methods described herein may identify those vulnerabilities and bring them to the attention of the system manager.

Figure 9:
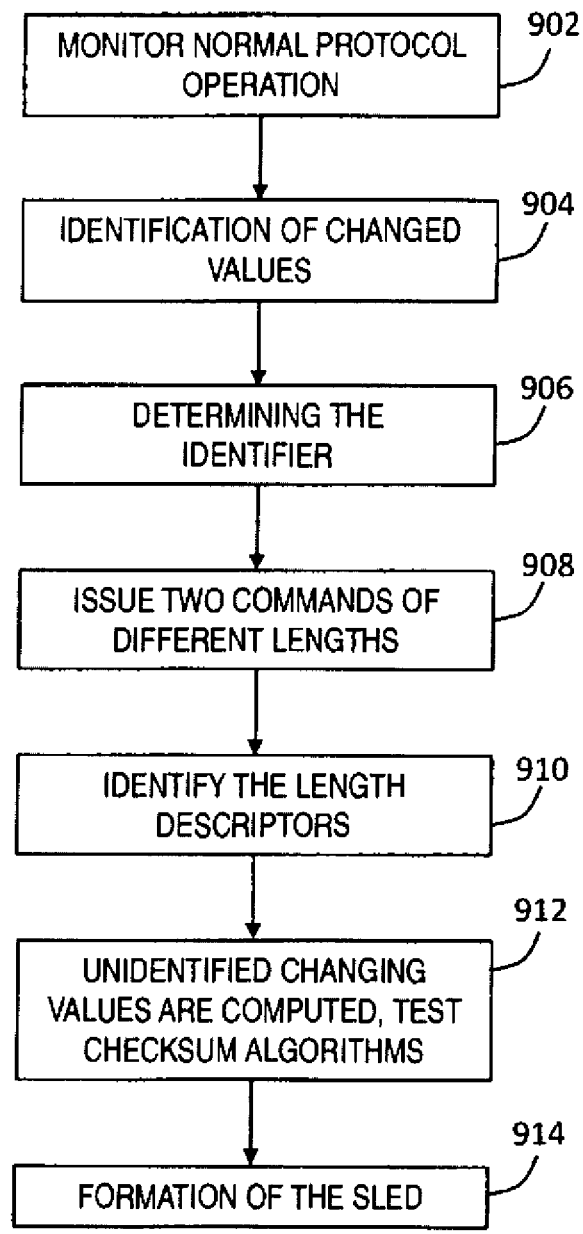
FIG. 9 is a diagram illustrating the steps of the system for determining whether a network is vulnerable to session takeover as used by an embodiment of the disclosed systems and methods.

For purposes of illustration, the data modification module 812 is explained in greater detail below in conjunction with the steps outlined in FIG. 9. The following description of the data modification module 812 in conjunction with the steps outlined in FIG. 9 focuses on the Net8 protocol, although the analysis is applicable to many types of protocols.

The first step in stealing an ongoing Oracle session, without the benefit of knowing little other than the publicly available facts pertaining to that protocol, is to analyze the protocol in operation so as to monitor normal protocol operation 902. Monitoring normal protocol operation 902 is, for example, accomplished by running the session identifier module 802, as well as the port estimation module 804 and/or the port validation module 806. By monitoring normal protocol operation 902, a new session will have been identified, and the port of the server will have been identified. Next, the session tracking module 808 is run to keep track of the session now being monitored. The client termination module 810 is run next to terminate the client's connection without raising suspicions that the session had been stolen.

At this point, the system will have located a packet containing characteristics that will allow for easy imitation, so as to allow a future packet containing malicious data to be readily accepted. A packet may be selected as containing characteristics that allow for easy imitation based on any desired characteristics. For example, a packet may be selected based on a number of times that an instruction included in the packet has been previously seen (e.g., the number of times that previously tracked packets have included the instruction). In another example, a packet may be selected based on the number or variety of parameters included in an instruction in the packet. For example, a packet may be selected because it includes an instruction with a large number and large variety of parameters.

The next step in carrying out the data modification module 812 is accomplished by the identification of changed values 904, which issues two identical commands and identifies the changed values returned in response to those two commands. Note that the identification of changed values step 904 operates in a particular manner for each protocol. In regard to the Net8 protocol, the data modification module 812 begins by first identifying the header portion of the Oracle Net8 protocol. Importantly, the data modification module 812 is able to discriminate between protocol headers that change in value, and the protocol headers that do not change in value. In regard to the header values that remain static during a session and do not change in value for the duration of the session, there may be no need to monitor or analyze those values. Instead, the unchanging header values are preserved so that the testing for session stealing can proceed successfully.

By issuing two identical commands, the identification of changed values step 904 allows the next step determination of the identifier 906 to occur. The example determining the "identifier" step 906 occurs when fields in a protocol change value from one query to the next query during an existing session, such as when the header of an Oracle protocol Oracle Net8 or other session-type protocol changes value. Those fields are typically one of three types of fields: i) an identifier; ii) a length descriptor; or iii) a checksum. As one of ordinary skill appreciates, an "identifier" field in a protocol header contains values that identify each query, and these values are returned by the server after it processes the request or query sent by the client. A "length descriptor" is a value in a protocol header that typically precedes data fields, and is used to inform the client or receiver about the size of the variable-length data string. A "checksum" is a value in a protocol header that represents the computation of the data included in the packet. A checksum is an effective countermeasure to protocol injection, if it is properly implemented as a "secure checksum". A secure checksum is a product of cryptographic algorithms. Simple checksums also exist, and are used to verify the data and are often easily guessed or reverse engineered by a third party. Because checksums are not enabled in the case of standard Oracle Net8 traffic, the Net8 protocol is especially vulnerable to session stealing.

The examples data modification module 812 next issues two commands of different length 908 so as to identify a changed value. This step is accomplished, for example, by first focusing on an Oracle SQL query that contains commands that will return a known subset of data. For example, when the attacker executes two identical queries one after the other, in Oracle Net8 the resulting packets appear the same to a sniffer except for one value. Given that the queries are identical, this differing hexadecimal value (highlighted below as "37" and "3B") is a good candidate for an identifier value.

```
First packet:
00000000  00 B8 00 00 06 00 00 00 - 00 00 03 5E 37 61 80 00   ...........^7a..
00000010  00 00 00 00 00 4C 64 6E - 05 1A 00 00 00 CC B9 06   .....Ldn.......
00000020  05 0D 00 00 00 00 00 00 - 00 00 BA 06 05 00 00 00   ................
00000030  00 01 00 00 00 00 00 00 - 00 00 00 00 00 00 00 00   ................
00000040  00 00 00 00 00 00 00 00 - 00 00 00 00 00 00 00 00   ................
00000050  00 02 BA 06 05 D4 70 6E - 05 00 00 00 00 00 00 00   ......pn........
00000060  00 00 00 00 00 10 BA 06 - 05 1A 73 65 6C 65 63 74   ..........select
00000070  20 6E 61 6D 65 20 66 72 - 6F 6D 20 65 6D 70 6C 6F    name from emplo
00000080  79 65 65 73 01 00 00 00 - 00 00 00 00 00 00 00 00   yees............
00000090  00 00 00 00 00 00 00 00 - 00 00 00 00 00 00 00 00   ................
000000A0  01 00 00 00 00 00 00 00 - 00 00 00 00 00 00 00 00   ................
000000B0  00 00 00 00 00 00 00 00   00 00 00 00 00 00 00 00   ................

Second packet:
00000000  00 B8 00 00 06 00 00 00 - 00 00 03 5E 3B 61 80 00   ...........^;a..
00000010  00 00 00 00 00 4C 64 6E - 05 1A 00 00 00 CC B9 06   .....Ldn.......
00000020  05 0D 00 00 00 00 00 00 - 00 00 BA 06 05 00 00 00   ................
00000030  00 01 00 00 00 00 00 00 - 00 00 00 00 00 00 00 00   ................
00000040  00 00 00 00 00 00 00 00 - 00 00 00 00 00 00 00 00   ................
00000050  00 02 BA 06 05 D4 70 6E - 05 00 00 00 00 00 00 00   ......pn........
00000060  00 00 00 00 00 10 BA 06 - 05 1A 73 65 6C 65 63 74   ..........selec
00000070  20 6E 61 6D 65 20 66 72 - 6F 6D 20 65 6D 70 6C 6F    name from empl
00000080  79 65 65 73 01 00 00 00 - 00 00 00 00 00 00 00 00   yees...........
00000090  00 00 00 00 00 00 00 00 - 00 00 00 00 00 00 00 00   ................
000000A0  01 00 00 00 00 00 00 00 - 00 00 00 00 00 00 00 00   ................
000000B0  00 00 00 00 00 00 00 00
```

As shown below, the packets that were exchanged between the two packets associated with the SQL query show the sequential progression of the value now determined to be the "identifier."

```
00000000  00 B8 00 00 06 00 00 00 - 00 00 03 5E 37 61 80 00   ...........^7a..
00000010  00 00 00 00 00 4C 64 6E - 05 1A 00 00 00 CC B9 06   .....Ldn........
00000020  05 0D 00 00 00 00 00 00 - 00 00 BA 06 05 00 00 00   ................
00000030  00 01 00 00 00 00 00 00 - 00 00 00 00 00 00 00 00   ................
00000040  00 00 00 00 00 00 00 00 - 00 00 00 00 00 00 00 00   ................
00000050  00 02 BA 06 05 D4 70 6E - 05 00 00 00 00 00 00 00   ......pn........
00000060  00 00 00 00 00 10 BA 06 - 05 1A 73 65 6C 65 63 74   ..........select
00000070  20 6E 61 6D 65 20 66 72 - 6F 6D 20 65 6D 70 6C 6F    name from emplo
00000080  79 65 65 73 01 00 00 00 - 00 00 00 00 00 00 00 00   yees............
00000090  00 00 00 00 00 00 00 00 - 00 00 00 00 00 00 00 00   ................
000000A0  01 00 00 00 00 00 00 00 - 00 00 00 00 00 00 00 00   ................
000000B0  00 00 00 00 00 00 00 00                             ........
```

```
00000000  00 15 00 00 06 00 00 00 - 00 00 03 05 38 01 00 00   ............8...
00000010  00 0F 00 00 00
```

```
00000000  00 1C 00 00 06 00 00 00 - 00 00 11 69 39 E0 74 06   ...........i9.t.
00000010  05 01 00 00 00 01 00 00 - 00 03 93 3A
```

```
00000000  00 B8 00 00 06 00 00 00 - 00 00 03 5E 3B 61 80 00   ...........^;a..
00000010  00 00 00 00 00 4C 64 6E - 05 1A 00 00 00 CC B9 06   .....Ldn........
00000020  05 0D 00 00 00 00 00 00 - 00 00 BA 06 05 00 00 00   ................
00000030  00 01 00 00 00 00 00 00 - 00 00 00 00 00 00 00 00   ................
00000040  00 00 00 00 00 00 00 00 - 00 00 00 00 00 00 00 00   ................
00000050  00 02 BA 06 05 D4 70 6E - 05 00 00 00 00 00 00 00   ......pn........
00000060  00 00 00 00 00 10 BA 06 - 05 1A 73 65 6C 65 63 74   ..........selec
00000070  20 6E 61 6D 65 20 66 72 - 6F 6D 20 65 6D 70 6C 6F    name from empl
00000080  79 65 65 73 01 00 00 00 - 00 00 00 00 00 00 00 00   yees............
00000090  00 00 00 00 00 00 00 00 - 00 00 00 00 00 00 00 00   ................
000000A0  01 00 00 00 00 00 00 00 - 00 00 00 00 00 00 00 00   ................
000000B0  00 00 00 00 00 00 00 00                             ........
```

Next the "length descriptor" is determined by executing two slightly different queries, one after the other. For example, executing a first SQL query of "select name from employees" will return the following data:

```
00000000  00 B8 00 00 06 00 00 00 - 00 00 03 5E 47 61 80 00   ...........^Ga..
00000010  00 00 00 00 00 4C 64 6E - 05 1A 00 00 00 CC B9 06   .....Ldn........
00000020  05 0D 00 00 00 00 00 00 - 00 00 BA 06 05 00 00 00   ................
00000030  00 01 00 00 00 00 00 00 - 00 00 00 00 00 00 00 00   ................
00000040  00 00 00 00 00 00 00 00 - 00 00 00 00 00 00 00 00   ................
00000050  00 02 BA 06 05 D4 70 6E - 05 00 00 00 00 00 00 00   ......pn........
00000060  00 00 00 00 00 10 BA 06 - 05 1A 73 65 6C 65 63 74   ..........selec
00000070  20 6E 61 6D 65 20 66 72 - 6F 6D 20 65 6D 70 6C 6F    name from empl
00000080  79 65 65 73 01 00 00 00 - 00 00 00 00 00 00 00 00   yees............
00000090  00 00 00 00 00 00 00 00 - 00 00 00 00 00 00 00 00   ................
000000A0  01 00 00 00 00 00 00 00 - 00 00 00 00 00 00 00 00   ................
000000B0  00 00 00 00 00 00 00 00                             ........
```

By next executing the SQL query "select * from employees", which is three less characters than the "select name from employees" first query, the returned data will be as follows:

```
00000000  00 B5 00 00 06 00 00 00 - 00 00 03 5E 4B 61 80 00  ...........^Ka.
00000010  00 00 00 00 00 50 64 6E - 05 17 00 00 00 CC B9 06  .....Pdn.......
00000020  05 0D 00 00 00 00 00 00 - 00 00 BA 06 05 00 00 00  ...............
00000030  00 01 00 00 00 00 00 00 - 00 00 00 00 00 00 00 00  ...............
00000040  00 00 00 00 00 00 00 00 - 00 00 00 00 00 00 00 00  ...............
00000050  00 02 BA 06 05 D4 70 6E - 05 00 00 00 00 00 00 00  ......pn.......
00000060  00 00 00 00 00 10 BA 06 - 05 17 73 65 6C 65 63 74  ..........selec
00000070  20 2A 20 66 72 6F 6D 20 - 65 6D 70 6C 6F 79 65 65   * from employe
00000080  73 01 00 00 00 00 00 00 - 00 00 00 00 00 00 00 00  s..............
00000090  00 00 00 00 00 00 00 00 - 00 00 00 00 01 00 00 00  ...............
000000A0  00 00 00 00 00 00 00 00 - 00 00 00 00 00 00 00 00  ...............
000000B0  00 00 00 00 00
```

Once issuing the two commands of different lengths step 908 is complete, the data modification module 812 executes the identification of the length descriptors step 910. The example identification of the length descriptors step 910 is accomplished by comparing the first set of returned data to the second set of data, and determining where in the second set a value corresponding to a similarly situated value in the first set of data decreased by a value of three. In regard to the data above there are two instances where the data returned in response to the second query decreased by a value of three (i.e., the difference in the length of the commands) in comparison to the data returned in response to the first query. The first instance is the decrease from B8 to B5, which corresponds to the length of the entire payload of the packet; and the second instance is two occurrences of 1A changing to 17, which corresponds to the length of the query in the packet.

Finally, the data modification module 812 executes the example computing changed values and checksum step 912 for the packets. This step is done through the process of elimination: a value that changes in a manner unlike an identifier or a length descriptor is considered to be a computed value. A number of algorithms to ensure data consistency of are publically known and widely used. These include Cyclic Redundancy Checks (CRC), XOR8, and Adler-32. CRC in particular implements a number of modes, which can be detected based on the length of the computed value. A 16-bit value, for example, would suggest the use of CRC-16. By using these algorithms to compute the value of both the data payload and the actual application query contained within, the algorithm used can sometimes be guessed. Once a matching value is found, one of ordinary skill would be able to perform the same function to ensure that the packet passes consistency checks when received by the Server.

Next, the example data modification module 812 performs the formation of the "sled" step 914. The example formation of the "sled" step 914 generates the Application Layer of the "sled." For example, in order to insert malicious data into the Application Layer (using an offset value that begins at zero) the data modification module 812 replaces the original command located in the packet with the malicious command. The data modification module 812 then changes offset 1 to the length of the modified data payload. By way of example, if the data payload was originally 184 bytes long, and the malicious data payload will be 204 bytes long, the value at offset 1 will be changed from B8 to CC. Next the data modification module 812 changes offsets 25 and 106 to the length of the modified command. By way of example, if the modified command was originally "select name from employees", and it was changed to "grant connect,dba to badguy identified by pass", offsets 25 and 106 will be changed from the value 1A to 2E. Finally, the example data modification module 812 changes offset 12 to a valid identifier that is based on the next unused value. By way of example, if this value was set to 4E in the last command observed, the value at offset 12 would be set to 4F.

Using these steps, an injection of data (or "sled") comprised of the command "grant connect.dba to badguy identified by pass" would be created by modifying the packet to the highlighted values as follows:

```
00000000  00 CC 00 00 06 00 00 00 - 00 00 03 5E 4F 61 80 00  ...........^.!..
00000010  00 00 00 00 00 50 64 6E - 05 2E 00 00 00 CC B9 06  .......|.......
00000020  05 0D 00 00 00 00 00 00 - 00 00 BA 06 05 00 00 00  ...............
00000030  00 01 00 00 00 00 00 00 - 00 00 00 00 00 00 00 00  ...............
00000040  00 00 00 00 00 00 00 00 - 00 00 00 00 00 00 00 00  ...............
00000050  00 02 BA 06 05 D4 70 6E - 05 00 00 00 00 00 00 00  ......n........
00000060  00 00 00 00 00 10 BA 06 - 05 2E 67 72 61 6E 74 20  ..........grant
00000070  63 6F 6E 6E 65 63 74 2C - 64 62 61 20 74 6F 20 62  connect,dba to b 00000080  61 64 67 75 79 20 69 64 - 65 6E 74 69 66 69 65 6    adguy identifie
00000090  20 62 79 20 70 61 73 73 - 01 00 00 00 00 00 00 00   by pass.......
000000A0  00 00 00 00 00 00 00 00 - 00 00 00 00 00 00 00 00  ...............
000000B0  00 00 00 00 01 00 00 00 - 00 00 00 00 00 00 00 00  ...............
000000C0  00 00 00 00 00 00 00 00 - 00 00 00 00
```

Once the Application Layer portion of the packet to be injected is created, the example formation of the sled step 914 modifies the TCP Layer of the sled to use the most up-to-date Sequence and Acknowledgement numbers, and then modifies the IP Layer "length" field with the correct packet size. This packet is then inserted onto the wire in the session takeover module 816, and from that point on, the attacker will have the ability to maintain the session as discussed above in the session takeover module 816.

In regard to the protocol headers discussed above, it is useful to identify these fields in the Oracle header, because, to determine whether a network is vulnerable to session stealing, the values of these fields will be modified.

Moreover, in regard to the example compromise determination module 326 performing its analysis on a network running Oracle Net8 protocol, it should be noted that the Oracle Net8 protocol uses at least two types of queries during its sessions. The first is a simple Net8 query that consists of a header starting with the text string "03 5e", and the second query, which is a bundled type of query, starts with "11 69". Within the "11 69" bundled call, a "03 5e" structure can be found during a database query. Each of these types of queries also uses a sequence number, which is incremented by the client for each separate transaction.

Furthermore, when using the Oracle Net8 protocol, error information can be obtained when an "Attention" packet is observed. Specifically, the attention packets that are observed during Oracle Net8 protocol testing described above are 11 bytes in length, with hex value "0c" at offset 4. At offset 10, a number is included that should be included in the query to obtain the error message. Using the bytes included in this section of the packet, combined with the Transmission Control Protocol/Internet Protocol frame of data, the systems and methods described herein can be used to gather the error code and its explanation. This information may be useful when attempting to imitate other features of actual Oracle clients. For example, the following code can be used to obtain the most recent error from the Oracle server.

```
# Query for error code using attn number
$tcp_obj->{data} = pack('C*', 0x00, 0x0b, 0x00, 0x00, 0x0c, 0x00,
0x00, 0x00, 0x01, 0x00, $session->{attn});
```

In the illustrated example in which a frame of data is gathered for insertion into an ongoing session so as to steal that session, the example compromise determination module 326 identifies a keyword or series of key bytes that will be present in favorable packets. By way of example, when attempting to determine the vulnerabilities of a network running a database protocol such as Oracle Net8, a good potential keyword to use is "select". This keyword "select" can be used in a regular expression so as to find a good candidate packet for use in a sled.

As discussed above, in order for the network penetration testing module 310 to detect vulnerabilities, it may monitor ongoing traffic from its man-in-the-middle position, and waits for a new session to be initiated. By way of example, in regard to Oracle Transparent Network Substrate protocol, it is known that this protocol commonly listens on port 1521/TCP for new sessions. Therefore, the network penetration testing module 310 can apply filters to determine when new sessions are initiated on that port.

However, problems may arise because certain Oracle protocols redirect connections to different ports once the session is established. One way the network penetration testing module 310 can accommodate for changing ports is to first keep track of connections established to port 1521 and to follow the CONNECT packet and wait for the server to send out a REDIRECT packet. At that point, the network penetration testing module 310 may create a filter to obtain the value sent as a parameter to "PORT=". From this point on, the compromise determination module 326 would apply the same logic to this newly discovered port in order to take over sessions.

One problem with this approach occurs if the Oracle database is not listening for the first packets at the default 1521/TCP port. If this is the case, the network penetration testing module 310 may define a range of common ports, such as ports 1521/TCP to 1721/TCP, and then monitor those ports for the presence of a CONNECT packet from the client. If a CONNECT request is found on one of those ports, the network penetration testing module 310 adds the used port to the list of ports that module listens to for CONNECT requests. From that point on, the network penetration testing module 310 knows the port that the new session is occurring, and can insert itself in a man-in-the-middle position so as to take over the session.

Finally, the example network penetration testing module 310 also can detect vulnerabilities in networks even if the session is short-lived. For example, it is known that even when the user exits a SQLplus session, the software does not immediately end the connection by sending the FIN packet. Instead, a negotiation occurs over the Oracle protocol. For example, the client sends the server a packet with the disconnect message "03 09". An example of a client disconnect message: 00 0D 00 00 06 00 00 00 00 00 03 09 15 The server then agrees to end the connection by sending a packet similar to the following: 00 11 00 00 06 00 00 00 00 00 09 01 00 00 00 00 00 When the network penetration module observes the client's intent to disconnect, this packet is not sent to the server. Instead, the client's traffic is blocked and the correct server disconnect message is sent to the client, which will cause the client to think the session has been successfully terminated. Of course, one of ordinary skill will recognize that different versions of protocols are constantly released, and so this scheme, as well as all the scheme discussed herein, will need to be modified to account for those variations.

Figure 10:
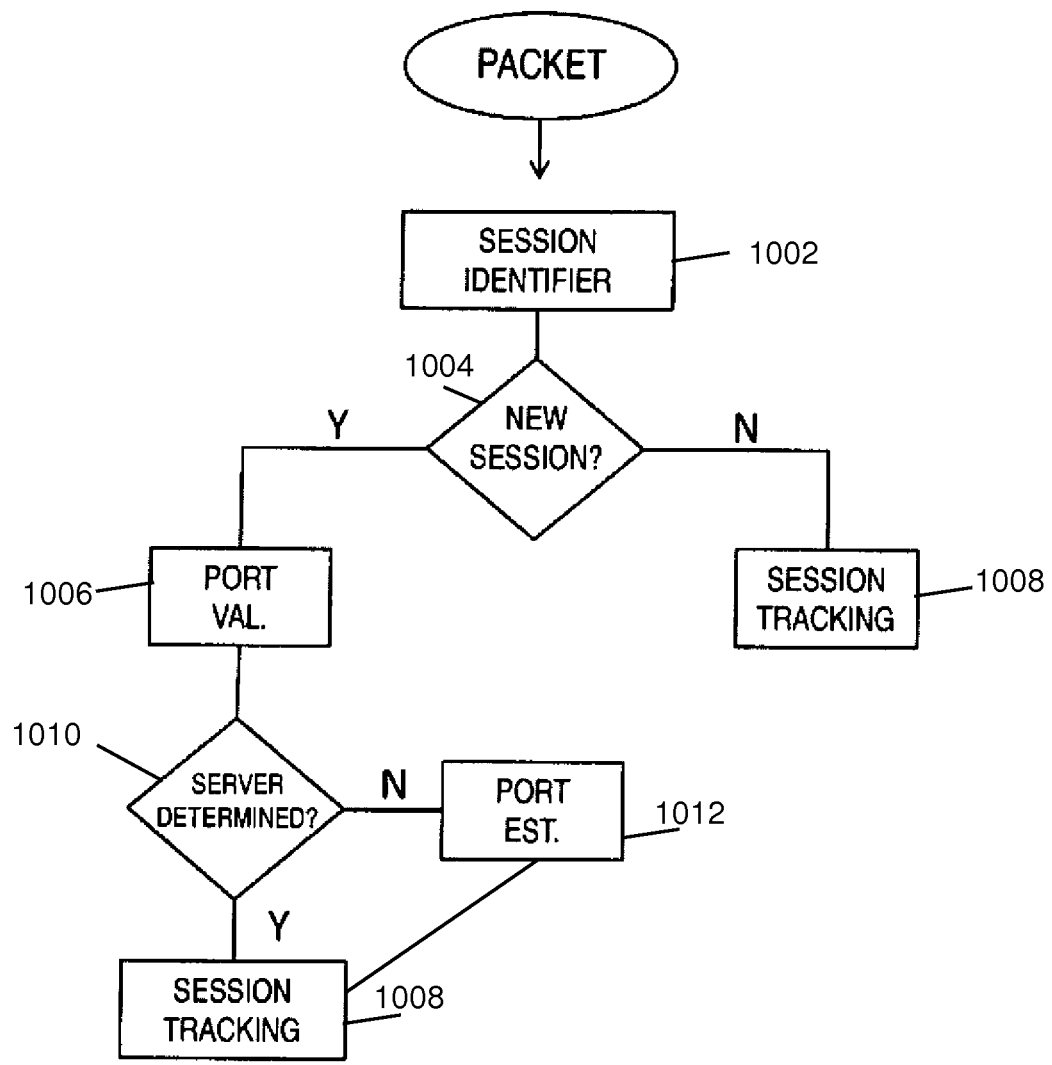
FIG. 10 is a flowchart of an example method to manage session information by the session tracking module of FIG. 8.

FIG. 10 is a flowchart of an example method to manage session information by the session tracking module 808. The method starts with receipt, by the session identifier module 802, of a packet that includes session identifier (block 1002). The session identifier module 802 determines if the session identifier identifies a new session (block 1004). For example, the session identifier may be determined to identify a new session when the session identifier differs from a previously received session identifier, is not on a list of previously received session identifiers, etc. When the session identifier does not identify a new session, session tracking by the session tracking module 808 continues as described above.

When the session identifier module 802 determines that the session identifier identifies a new session (block 1004), the session identifier module 802 initiates port validation by the port validation module 806 (block 1006). Based on the results of the port validation, as previously described herein, the port validation module determines if a server associated with the communication session can be determined (block 1010). When server was determined, session tracking by the session tracking module 808 is initiated as described above. When a server was not determined, port estimation is performed by the port estimation module 804, as previously described herein (block 1012). After estimating which device in the session is the server, session tracking by the session tracking module 808 is initiated as described above.

Figure 8:
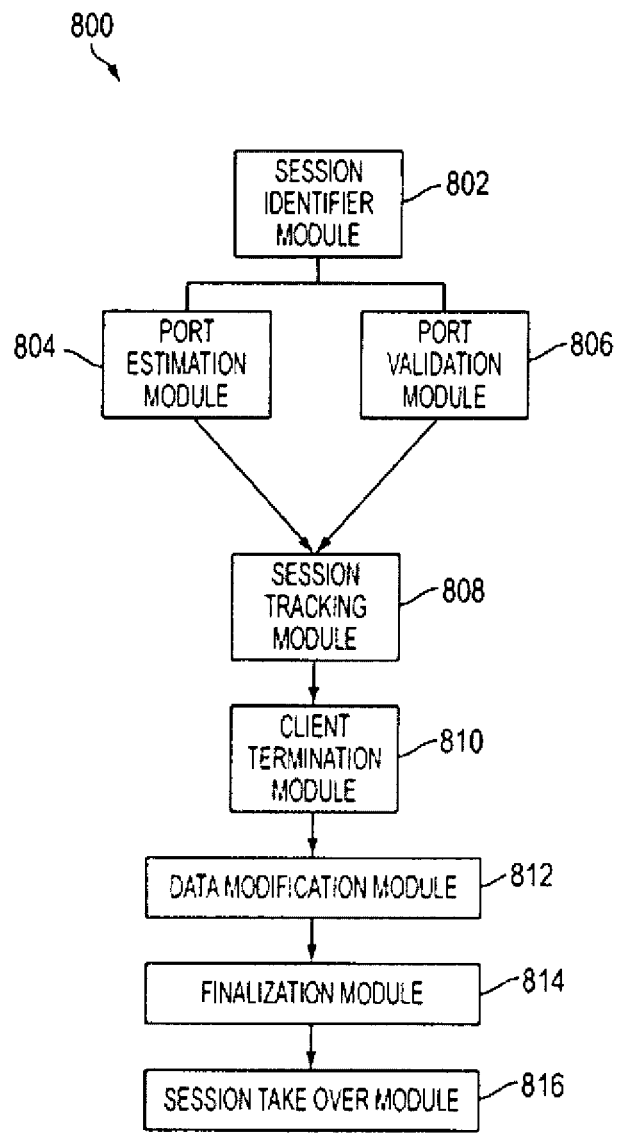
FIG. 8 is a diagram illustrating the determination of whether a system is vulnerable to session takeover as used by an embodiment of the disclosed systems and methods.
Figure 11:
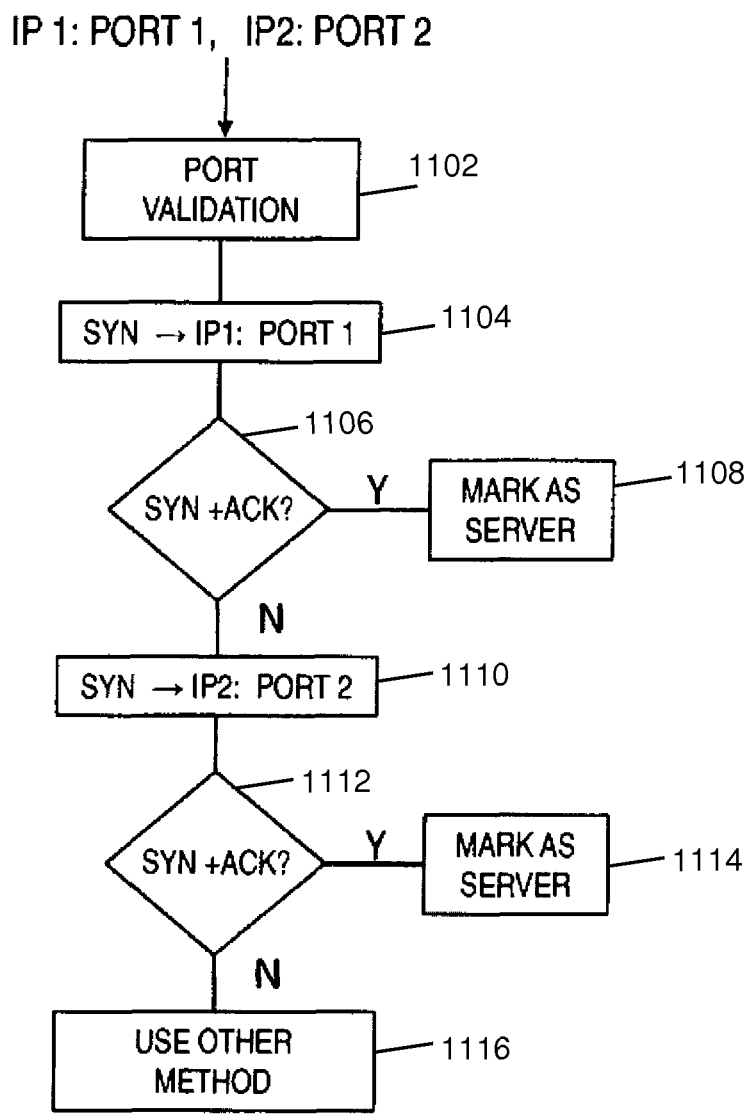
FIG. 11 is a flowchart of an example implementation of the port validation of FIG. 8.

FIG. 11 is a flowchart of an example implementation of the port validation 806 of FIG. 8. The example method begins when port validation is triggered (block 1102). For example, port validation may be initiated, as described in conjunction with FIG. 10, when a new session is detected by the session identifier module 802. A first SYN packet is transmitted to a first IP address (IP1) and corresponding port (PORT 1) identified in a packet associated with the communication session (block 1104). The port validation module 806 determines if a SYN+ACK packet was received in response to the SYN packet in block 1104 (block 1106). When a SYN+ACK packet was received, the device associated with the first IP address is marked as the server in the communication session (block 1108) and the method terminates or control proceeds to another method.

When a SYN+ACK packet was not received (block 1106), the port validation module 806 transmits a SYN packet to a second IP address (IP2) and corresponding port (PORT 2) for a second device (block 1110). The port validation module 806 determines if a SYN+ACK packet was received in response to the SYN packet in block 1110 (block 1112). When a SYN+ACK packet was received, the device associated with the second IP address is marked as the server in the communication session (block 1114) and the method terminates or control proceeds to another method. When a SYN+ACK packet was not received, control proceeds to a further method for determining the server in the communication session (block 1116). For example, the port estimation module 804 may perform port estimation to determine which device is the server based on the port numbers PORT 1 and PORT 2 and a table of known port numbers, as previously described herein.

Figure 12:
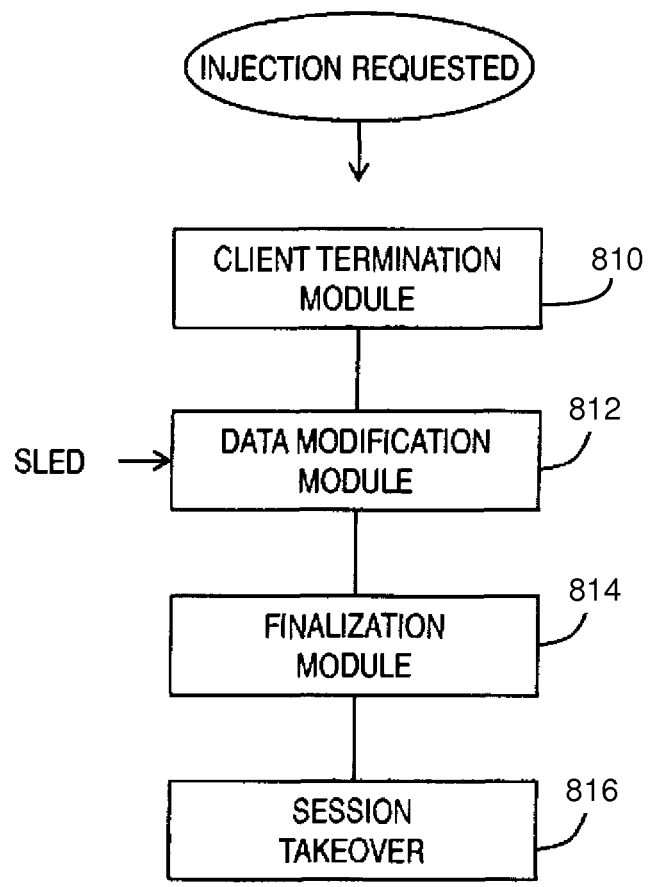
FIG. 12 illustrates the operation of the blocks of FIG. 8 when a session takeover is requested.

FIG. 12 illustrates the operation of the blocks of FIG. 8 when a session takeover is requested. When a command injection or session takeover is requested, the client termination module 810 terminates a client of a communication session being tracked by the session tracking module 808. For example, the session tracking module 808 may currently be tracking a session between a client and a server and the client termination module 810 may instruct the client to terminate the session while keeping the session active at the server. The data modification module 812 receives or obtains a template or "sled" to be modified. The data modification module 812 modifies utilizes the sled to determine how to modify a packet by inserting data in the replaceable fields identified by the sled. For example, the data modification module 812 may insert one or more of a command or instruction, a sequence, a length, a computed field, etc. The finalization module 814 finalizes the modified packet. For example, in some examples, some or all of the fields are identified by the data modification module 812 and the data is inserted by the finalization module 814. Lastly, the session takeover module 816 causes the packet to be transmitted to the server for execution. Accordingly, a session is taken over so that commands from a device other than the client can be transmitted to and accepted by the server.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   intercepting, at a first computing device, an packet sent from a client to a second computing device different than the first computing device, the packet including a first instruction in a first portion of the packet;
   determining, using a template, a second portion of the packet that is a value that is changed by a calculated amount each time that the client sends a packet;
   changing the value by the calculated amount to determine a next value for a next packet;
   replacing the second portion of the packet with the next value to generate a modified packet;
   replacing the first portion of the modified packet with a second instruction; and
   transmitting the modified packet to the second computing device.

2. A method as defined in claim 1, further comprising determining if the second computing device accepts the modified packet.

3. A method as defined in claim 1, further comprising determining if the second computing device executes the second instruction.

4. A method as defined in claim 3, further comprising notifying an entity associated with the second computing device in response to determining that the second computing device executed the second instruction.

5. A method as defined in claim 3, further comprising generating a report indicating whether or not the second computing device executes the second instruction.

6. A method as defined in claim 1, wherein the calculated amount is identified in the template.

7. A method as defined in claim 1, wherein the calculated amount is an integer by which the value is incremented.

8. A method as defined in claim 1, further comprising determining, using the template, that the first portion of the packet includes the first instruction.

9. A method as defined in claim 1, wherein the template identifies a byte offset of at least one of the first portion or the second portion.

10. A method as defined in claim 1, wherein the first packet is associated with an existing communication session between the client and the second computing device.

11. A method as defined in claim 10, further comprising instructing the client to terminate the session after receiving the packet at the first computing device.

12. A method as defined in claim 10, wherein the modified packet is associated with the session.

13. A method as defined in claim 1, further comprising at least one of:
   instructing an address resolution protocol system to replace an address of the second computing device with an address of the first computing device;
   instructing a domain name system to replace an address of the second computing device with an address of the first computing device; and
   changing a network address of the second computing device from a first address to a second address and changing a network address of the first computing device to the first address.

14. A method as defined in claim 1, further comprising:
   receiving a plurality of packets including the packet at the first computing device from the client;
   determining a number of times that the first instruction is included in the plurality of packets; and
   selecting the packet for modification when the number of times meets a threshold.

15. A method as defined in claim 1, further comprising:
   determining a number of parameters in the first instruction; and
   selecting the packet for modification when the number of parameters meets a threshold.

16. A method as defined in claim 1, further comprising storing the next value to be used in determining a value for a second modified packet.

17. A method as defined in claim 1, wherein the second portion is a packet sequence number.

18. A tangible computer readable storage medium storing instructions that, when executed, cause a machine to at least:

intercept, at a first computing device, an packet sent from a client to a second computing device different than the first computing device, the packet including a first instruction in a first portion of the packet;

determine, using a template, a second portion of the packet that is a value that is changed by a calculated amount each time that the client sends a packet;

change the value by the calculated amount to determine a next value for a next packet;

replace the second portion of the packet with the next value to generate a modified packet;

replace the first portion of the modified packet with a second instruction; and transmit the modified packet to the second computing device.

19. A tangible computer readable storage medium as defined in claim 18, wherein the instructions, when executed further cause the machine to determine if the second computing device accepts the modified packet.

20. A tangible computer readable storage medium as defined in claim 18, wherein the instructions, when executed further cause the machine to determine if the second computing device executes the second instruction.

21. An apparatus comprising:

a session tracking module to intercept, at a first computing device, an packet sent from a client to a second computing device different than the first computing device, the packet including a first instruction in a first portion of the packet and to determine, using a template, a second portion of the packet that is a value that is changed by a calculated amount each time that the client sends a packet;

a data modification module to change the value by the calculated amount to determine a next value for a next packet and to replace the second portion of the packet with the next value to generate a modified packet, and to replace the first portion of the modified packet with a second instruction; and a finalization module to transmit the modified packet to the second computing device.

* * * * *